United States Patent
Aruga

(10) Patent No.: US 10,877,360 B2
(45) Date of Patent: Dec. 29, 2020

(54) LENS ARRAY AND LIGHTING OPTICAL SYSTEM

(71) Applicant: NICHIA CORPORATION, Anan (JP)

(72) Inventor: Takanori Aruga, Suwa-gun (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 16/777,157

(22) Filed: Jan. 30, 2020

(65) Prior Publication Data

US 2020/0249552 A1 Aug. 6, 2020

(30) Foreign Application Priority Data

Jan. 31, 2019 (JP) .................................. 2019-016113
Mar. 19, 2019 (JP) .................................. 2019-051217

(51) Int. Cl.
*G03B 21/14* (2006.01)
*G02B 27/09* (2006.01)
(Continued)

(52) U.S. Cl.
CPC ....... *G03B 21/142* (2013.01); *G02B 26/0833* (2013.01); *G02B 27/0966* (2013.01); *G03B 21/208* (2013.01); *G03B 21/008* (2013.01)

(58) Field of Classification Search
CPC .... G03B 21/14; G03B 21/208; G03B 21/142; G03B 21/008; G02B 3/0006;
(Continued)

(56) References Cited

U.S. PATENT DOCUMENTS 10,288,774 B2* 5/2019 Kaneda ................ G02B 3/0043

2003/0133078 A1 7/2003 Iechita et al.
(Continued)

FOREIGN PATENT DOCUMENTS

JP H09222581 A 8/1997
JP 2002-31845 A 1/2002
(Continued)

OTHER PUBLICATIONS

Extended Search Report, dated May 29, 2020, for European Application No. 20154500.1.

*Primary Examiner* — William C. Dowling
(74) *Attorney, Agent, or Firm* — Birch, Stewart, Kolasch & Birch, LLP

(57) ABSTRACT

A lens array includes: an input-lens collective body, which is a collective body of input lenses each having a different optical power in a first direction and in a second direction orthogonal to the first direction, the input lenses being aligned along the second direction for which the input lenses have a larger optical power; and an output-lens collective body, which is a collective body of output lenses each having a different optical power in the first direction and in the second direction orthogonal to the first direction, the output lenses being optically opposed to the input lenses, and being aligned along the second direction. Respective lens dimensions of the input lenses are defined so that the input-lens collective body forms a predetermined irradiated region in the irradiated plane by a collection of irradiated areas of light irradiated from the lens array. Positions of respective lens protruding end portions of the output lenses are defined so that the respective irradiated areas of the output lenses correspond to any one of the irradiated areas which area respectively formed at different positions, and at least a portion of each of the irradiated areas overlaps with at least a portion of the adjacent irradiated areas.

21 Claims, 22 Drawing Sheets

(51) Int. Cl.
*G03B 21/20* (2006.01)
*G02B 26/08* (2006.01)
*G03B 21/00* (2006.01)

(58) Field of Classification Search
CPC .. G02B 3/0037; G02B 3/0043; G02B 3/0068; G02B 27/0966; G02B 26/0833; H04N 9/31; H04N 9/3152
USPC .......................................................... 353/38
See application file for complete search history.

(56) References Cited

U.S. PATENT DOCUMENTS

| | | |
|---|---|---|
| 2004/0156130 A1 | 8/2004 | Powell et al. |
| 2004/0207104 A1 | 10/2004 | Ono et al. |
| 2011/0051253 A1 | 3/2011 | Mitra et al. |
| 2013/0271735 A1 | 10/2013 | Tanaka |
| 2017/0299922 A1 | 10/2017 | Matsuura et al. |
| 2020/0103731 A1* | 4/2020 | Aruga ...................... H04N 9/31 |

FOREIGN PATENT DOCUMENTS

| | | |
|---|---|---|
| JP | 2005-259653 A | 9/2005 |
| JP | 2013-218235 A | 10/2013 |
| JP | 2016-65907 A | 4/2016 |

* cited by examiner

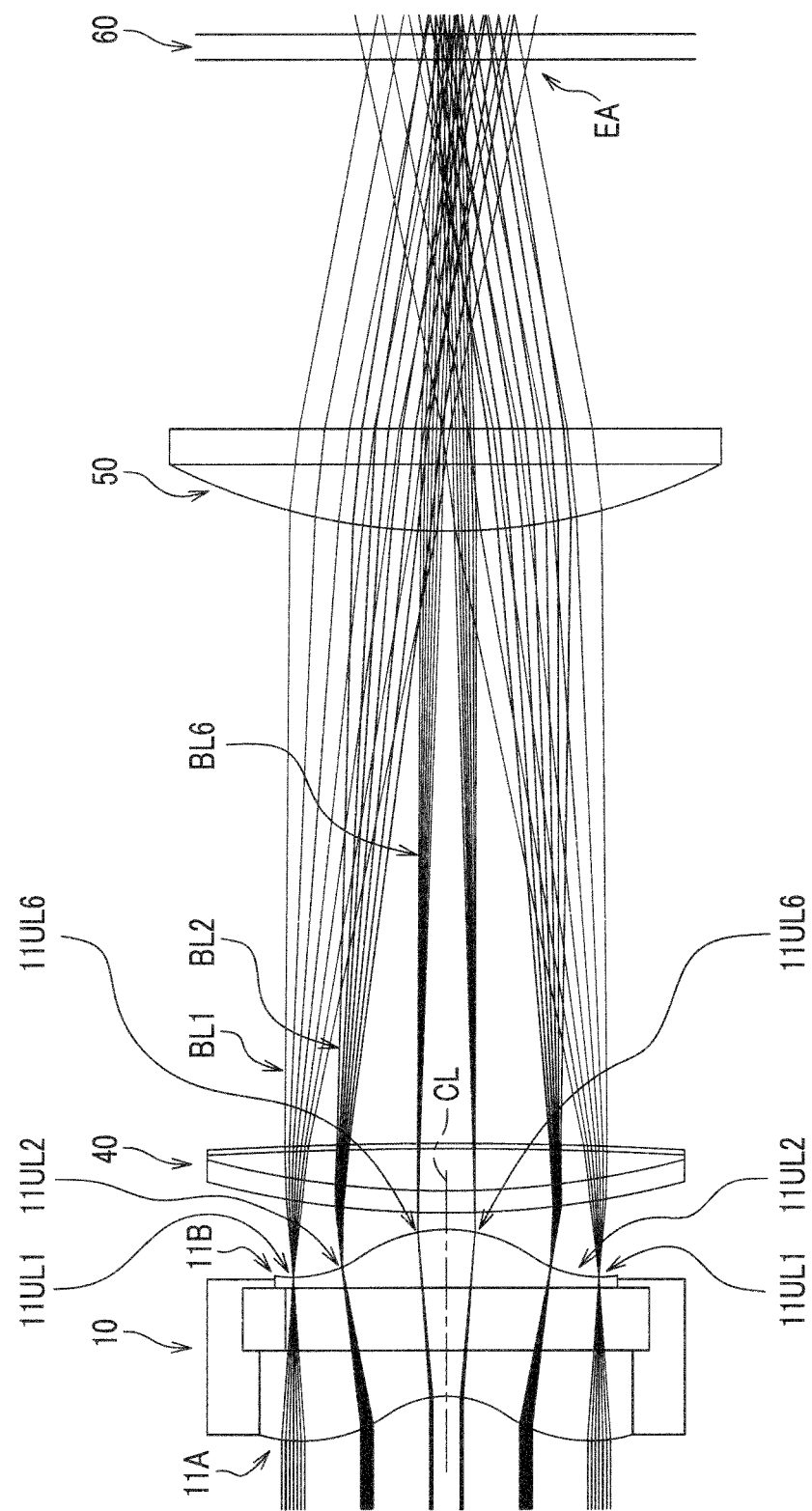

LENS ARRAY AND LIGHTING OPTICAL SYSTEM

CROSS-REFERENCE TO RELATED APPLICATIONS

This application is based upon and claims the benefit of priorities from Japanese Patent Application No. 2019-016113 filed on Jan. 31, 2019 and from Japanese Patent Application No. 2019-051217 filed on Mar. 19, 2019, the entire contents of which are incorporated herein by reference.

TECHNICAL FIELD

The present disclosure relates to a lens array and a lighting optical system.

BACKGROUND

There has been attention focused on development of an ADB (Adaptive Driving Beam) as an application of LCD (Liquid Crystal Device), LCOS (Liquid Crystal On Silicon), DMD (Digital Micromirror Device), etc. A conventional lighting optical system includes light emitter source, input side lenses and output side lenses. Further, the lighting optical system includes at least one input side lens having an aperture shape smaller than the aperture shape which provides just focusing of the light from the light source on an irradiated plane, by which the lighting optical system is adjusted to provide a planar distribution having a higher luminosity at the center of the irradiated plane and a lower luminosity at the peripheral area thereof. (refer to Japanese Patent Publication No. H09-222581).

SUMMARY

However, when an lighting optical system of a conventional configuration is used, in order to realize a uneven distribution of irradiation, it is necessary to have a configuration of an input side lens and an output side lens having a portion in which a connection portion between adjacent single lenses has a very large difference in sizes, more specifically it is necessary to have a configuration having a large level difference in the connection portion between adjacent single lenses. Therefore, when the irradiation distribution is uneven, the level difference of the input side lenses or of the output side lenses would be larger, resulting in manufacturing difficulty.

Therefore, an object of the present invention is to provide a lens array and a lighting optical system which does not form a large level difference even when a lens system having an uneven irradiation distribution is employed.

A lens array related to the present disclosure includes: an input-lens collective body, which is a collective body of input lenses each having a different optical power in a first direction and in a second direction orthogonal to the first direction, the input lenses being aligned along the second direction for which the input lenses have a larger optical power; and an output-lens collective body, which is a collective body of output lenses each having a different optical power in the first direction and in the second direction orthogonal to the first direction, the output lenses being optically opposed to the input lenses and being aligned along the second direction. Respective lens dimensions of the input lenses are defined so that the input-lens collective body forms a predetermined irradiated region in an irradiated plane by a collection of irradiated areas of light irradiated from the lens array. Positions of respective lens protruding end portions of the output lenses are defined so that respective irradiated areas of the output lenses correspond to any one of the irradiated areas which area respectively formed at different positions, and at least a portion of each of the irradiated areas overlaps with at least a portion of adjacent irradiated areas.

The lighting optical system related to an embodiment of the present disclosure includes: a first optical member arranged in an optical path of light emitted from a light source, the first optical member transforming light from the light source to be approximately parallel, a lens array according; a second optical member arranged in an optical path of light from the lens array; light modulator which outputs light inputted from the second optical member by changing light path of the light; and a projection lens projecting light from the light modulator.

In the lens array related to the embodiment of the present disclosure, a large level difference is not formed, even when a lens configuration having an uneven irradiation distribution is employed.

The lighting optical system related the embodiment of the present disclosure can be manufactured with less difficulty, even when a lens configuration providing an uneven irradiation distribution is employed. This can achieve a shape of an irradiated region suited for a head light.

BRIEF DESCRIPTION OF DRAWINGS

FIG. 7 is an explanatory figure showing a relation between an input/output position of light in vertical direction of the lens array related to the first embodiment and a vertical irradiated position in an irradiated plane of the light.

DESCRIPTION

In the following, embodiments will be explained referring to the figures as necessary. However, the embodiments shown in the following are those describing a lens array and a lighting optical system for realizing the technical idea of the present embodiments, which do not limit the present invention to these embodiments. Further, the dimensions, materials, and their relative placements, etc., which are described in the embodiments, are not intended to limit the scope of the present invention to these and are merely explanatory examples. It should be noted that the size and the positional relationships of the members shown in respective figures can be exaggerated. Further, in the referred figures, as an example, in the lens array, the Z-direction or the up-down direction is assumed to be the vertical direction, the X-direction is assumed to be the lateral direction, and the Y-direction is assumed to be the width direction. Further, the side of the input-lens collective body is assumed to be the front side.

Outline of Lens Array and Outline of Irradiated Areas

As shown in FIGS. 1 to 4, the lens array 10 includes an input-lens collective body 11A, a collective body of input lenses 11a each having a different optical power in one direction (X-direction: lateral direction) and in another direction (Z-direction: vertical direction) orthogonal thereto and being aligned along the other direction for which the input lenses have a larger optical power; and an output-lens collective body 11B which is a collective body of output lenses 11b each having a different optical power in the one direction and in the other direction orthogonal thereto, being arranged to optically oppose the input lenses 11a, and being aligned along the other direction. Respective lens dimensions of the input lenses 11a are defined so that the input-lens collective body 11A forms a predetermined irradiated region EA in the irradiated plane of a collective plurality of irradiated areas of light irradiated from the lens array 10. Positions of respective lens protruding end portions TLb (refer to FIG. 5) of the output lenses 11b are defined so that the respective irradiated areas of the output lenses 11b correspond to any one of the irradiated areas and the respective irradiated areas, which are positioned differently, forming the irradiated region EA, and respective irradiated areas overlap at least partially with the adjacent irradiated areas.

In FIGS. 1 to 8C, the explanations are given exemplarily for a case, where three types of input lenses 11a of the lens array 10 having dimensions (sizes) of the same lateral width and different vertical widths are employed, and the output lenses 11b all having a same lateral lens width and a same vertical lens width are employed.

Figure 1:
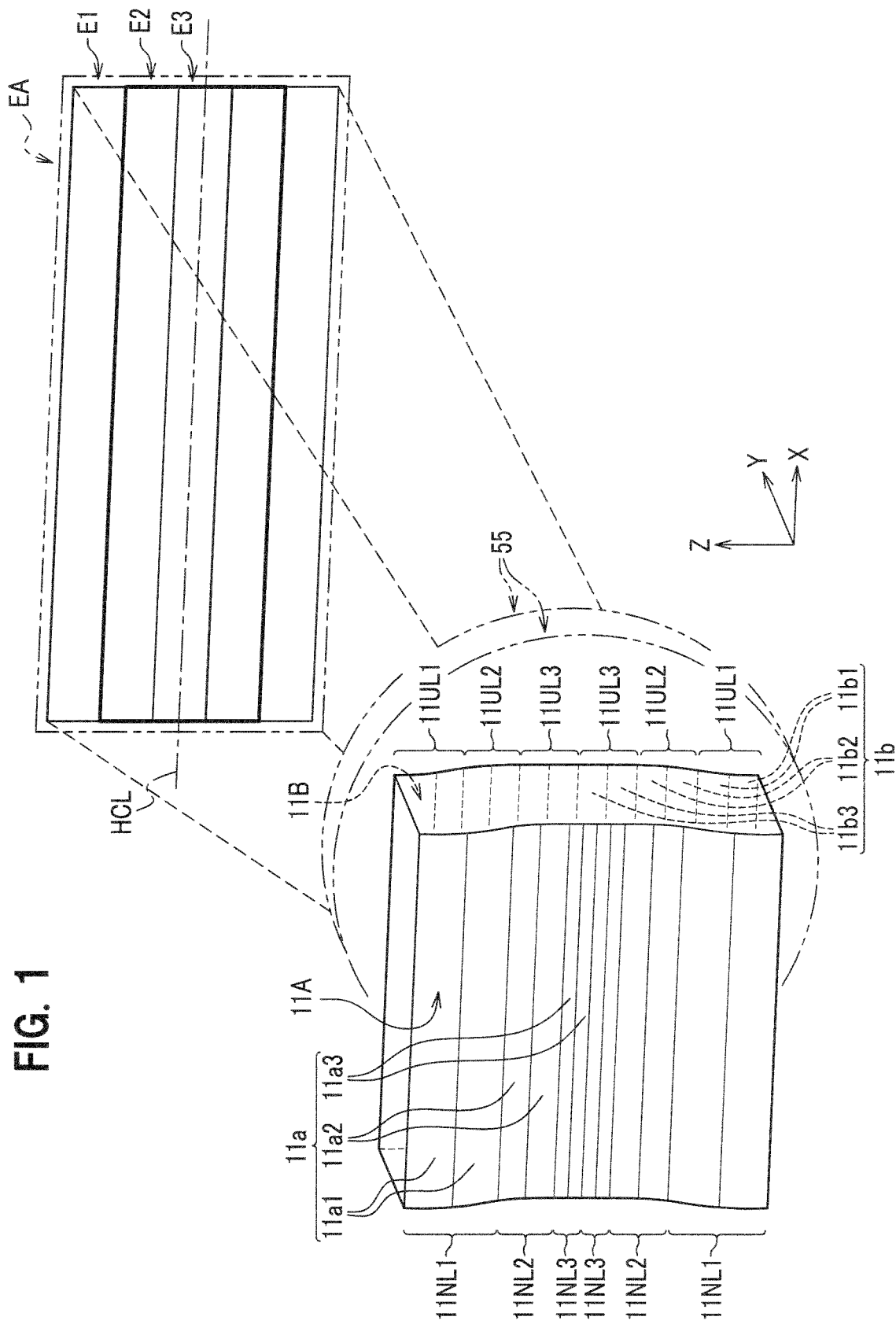
FIG. 1 is an explanatory figure schematically showing a relation between a lens array related to a first embodiment and irradiated areas.

As shown in FIG. 1, the irradiated region EA of the lens array 10 is defined roughly by the first irradiated area E1, the second irradiated area E2, and the third irradiated area E3. The irradiated region EA is set to have a predetermined distribution of light irradiation intensity, where a higher irradiation intensity is achieved at the center, more specifically the center is set to be brighter. In the lens array 10, a plurality of input lens groups, each including a plurality of input lenses, are arranged, and the vertical lens width of each of the input lenses in the input lens group is set to be smaller as approaching to the lens plane center CL.

Figure 2:
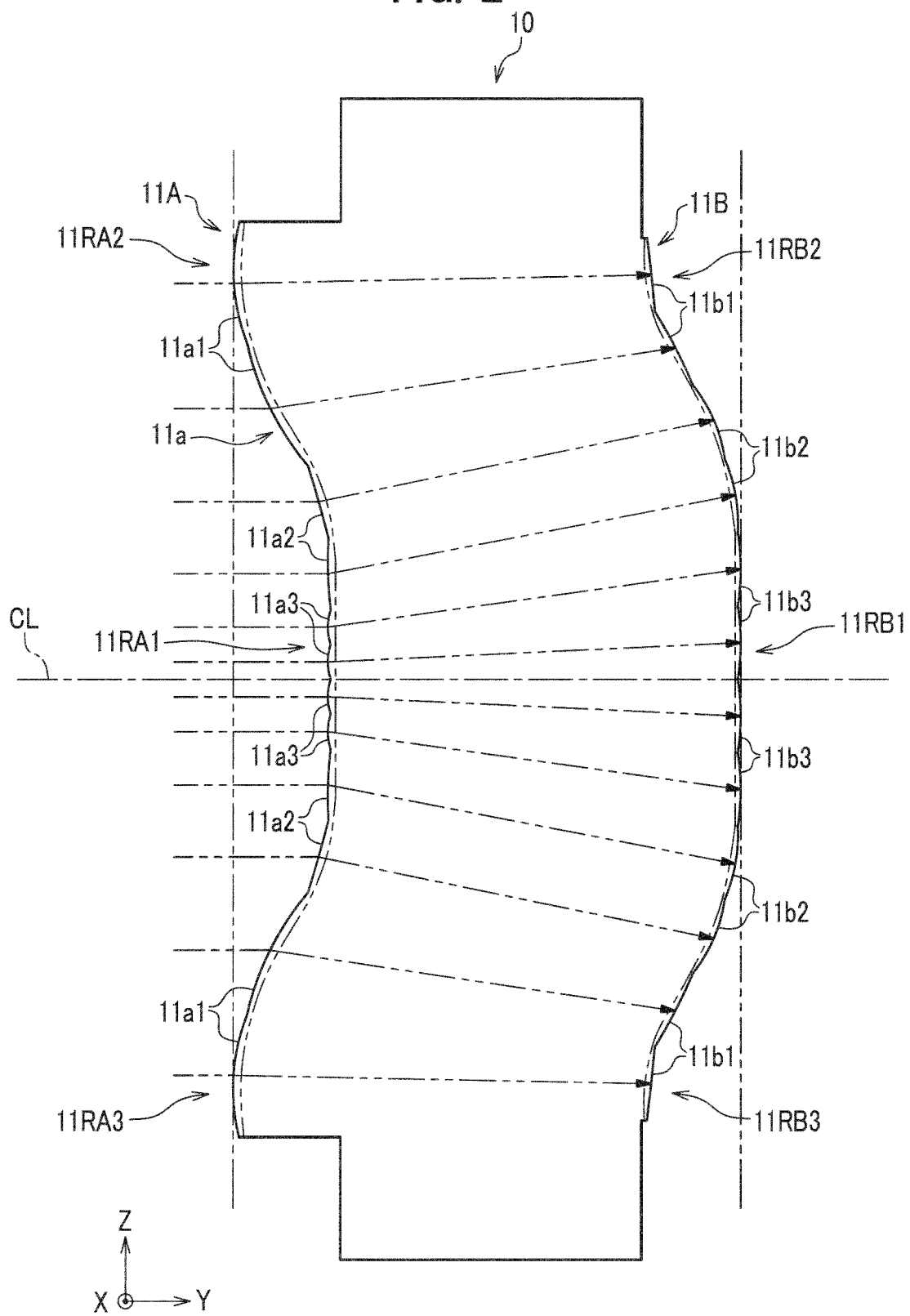
FIG. 2 is a side view schematically showing the lens array related to the first embodiment.
Figure 5:
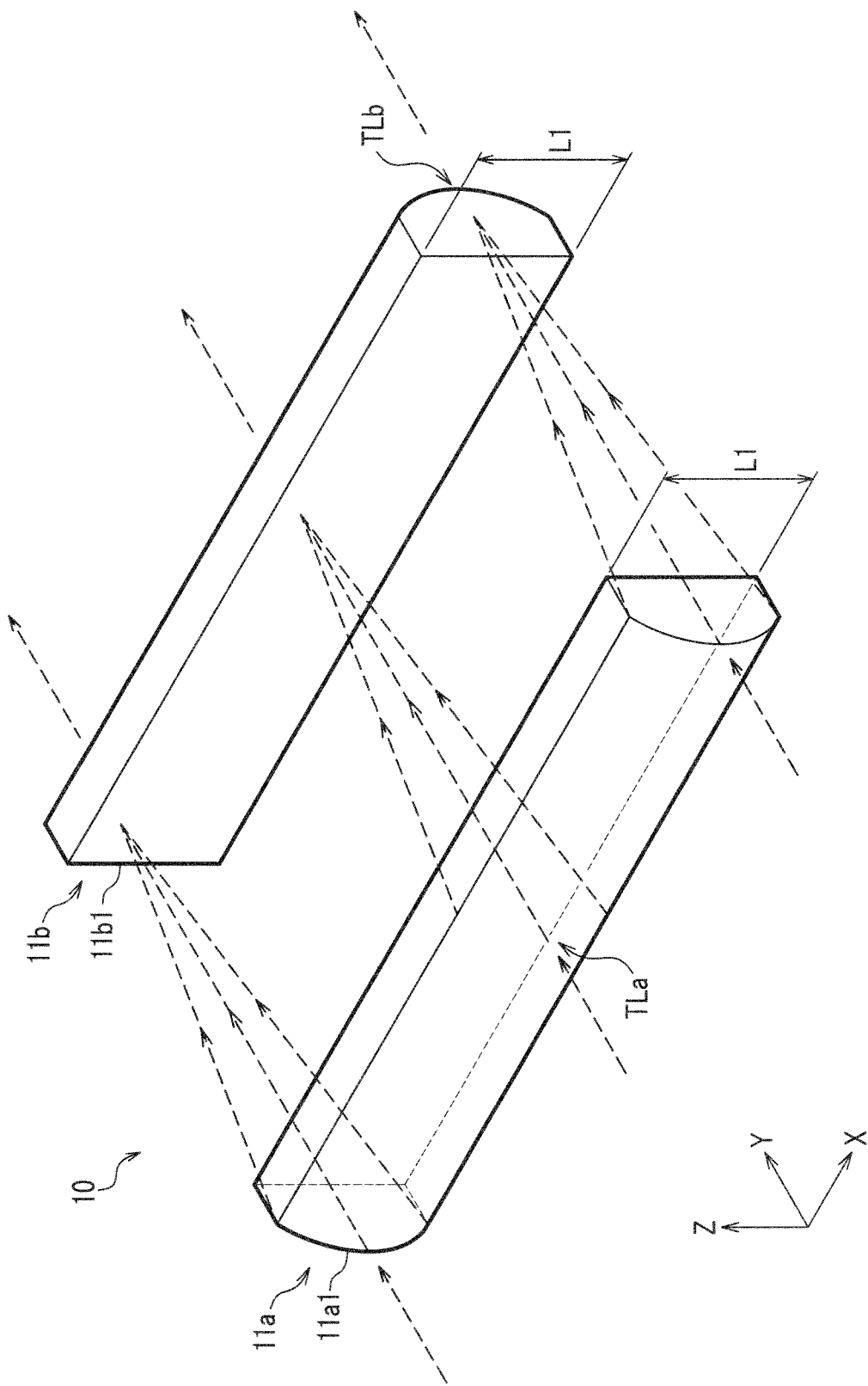
FIG. 5 is a perspective view schematically showing an optical relation between the opposing input lens and output lens of the lens array related to the first embodiment.
Figure 6:
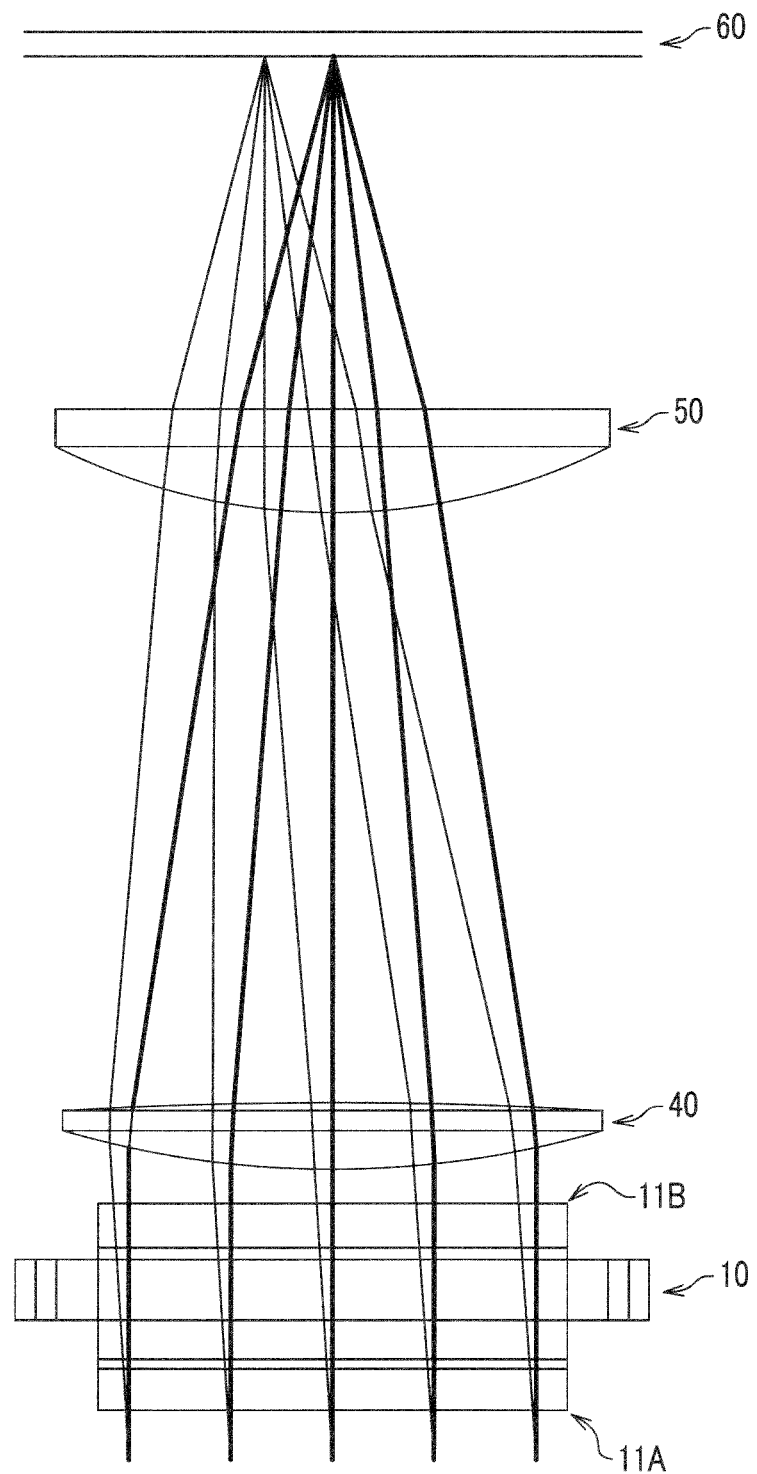
FIG. 6 is an explanatory figure schematically showing a relation between input and output positions of light in lateral direction of the lens array related to the first embodiment and a lateral irradiated position in an irradiated plane of the light.

As shown in FIG. 2 and FIG. 5, "optically opposed" represents a positional relation between an input lens 11a and a corresponding output lens 11b, in which a portion of light (BL) entered into an input lens 11a is outputted from the output lens 11b. In this embodiment, lenses each having a rectangular shape, seen from the light-input direction is exemplarily explained, and the lens dimensions represent a lateral lens width in X-direction and a vertical lens width in Z-direction. The lines, which are given in figures indicating light paths, regions or areas irradiated with light, are only for easier understanding and are not actually existing.

Input Lens

In the following, the input lens 11a is explained in reference to FIGS. 1 to 5.

The input-lens collective body 11A is formed with the input lenses 11a. An input lens 11a is a member to which light from a light source is entered and provides the inputted light to an optically opposing output lens 11b. For example, the input lenses 11a can be convex cylindrical lenses, which are rectangular shape seen from the light-input direction and have the same lateral width and different vertical widths. The convex cylindrical lens does not collect light as optical power in lateral direction, but collects light as an optical power, in other direction which is a vertical direction orthogonal to the lateral direction. In the present embodiment, first input lenses 11a1, second input lenses 11a2, and third input lenses 11a3, which have different vertical lens widths, are employed as the input lenses 11a. The input lenses 11a are aligned in vertical direction (Z-direction: other direction) to contact each other, which form the input-lens collective body 11a. The input lenses 11a are aligned so as to form a wavy input lens plane in the input-lens collective body 11A as shown in FIG. 2. More specifically, the input-lens collective body 11A is formed so that the input lens plane has a wavy form at the input-side surface as a concave shape toward the direction to the output-lens collective body 11B, in which the center of the input-lens collective body 11A is recessed, forming a recessed input side concave curved surface 11RA1 and the both ends of the input-lens collective body project, forming input side convex curved surfaces 11RA2, 11RA3.

The curved shapes formed with the input side concave curved surface 11RA1 and the input side convex curved surfaces 11RA2, 11RA3 are different depending on the alignment sequence in the vertical direction of the input lenses 11a. More specifically, in the input-lens collective body 11A, the third input lenses 11a3 having smaller vertical widths are arranged at around the lens plane center CL of the vertical direction, and both of the second input lenses 11a2 and the first input lenses 11a1 are arranged at both sides of the third input lenses 11a3 of the input-lens collective body 11A, in which the vertical widths of the input lenses 11a2, 11a1 become smaller as approaching to the ends of the input-lens collective body 11A. Accordingly, the input-lens collective body 11A is so formed that the input side concave curved surface 11RA1 is formed around the lens plane center CL, and the input side convex curved surfaces 11RA2, 11RA3 are respectively formed upper and lower sides of the concave curved surface 11RA1.

First Input Lens

Figure 3:
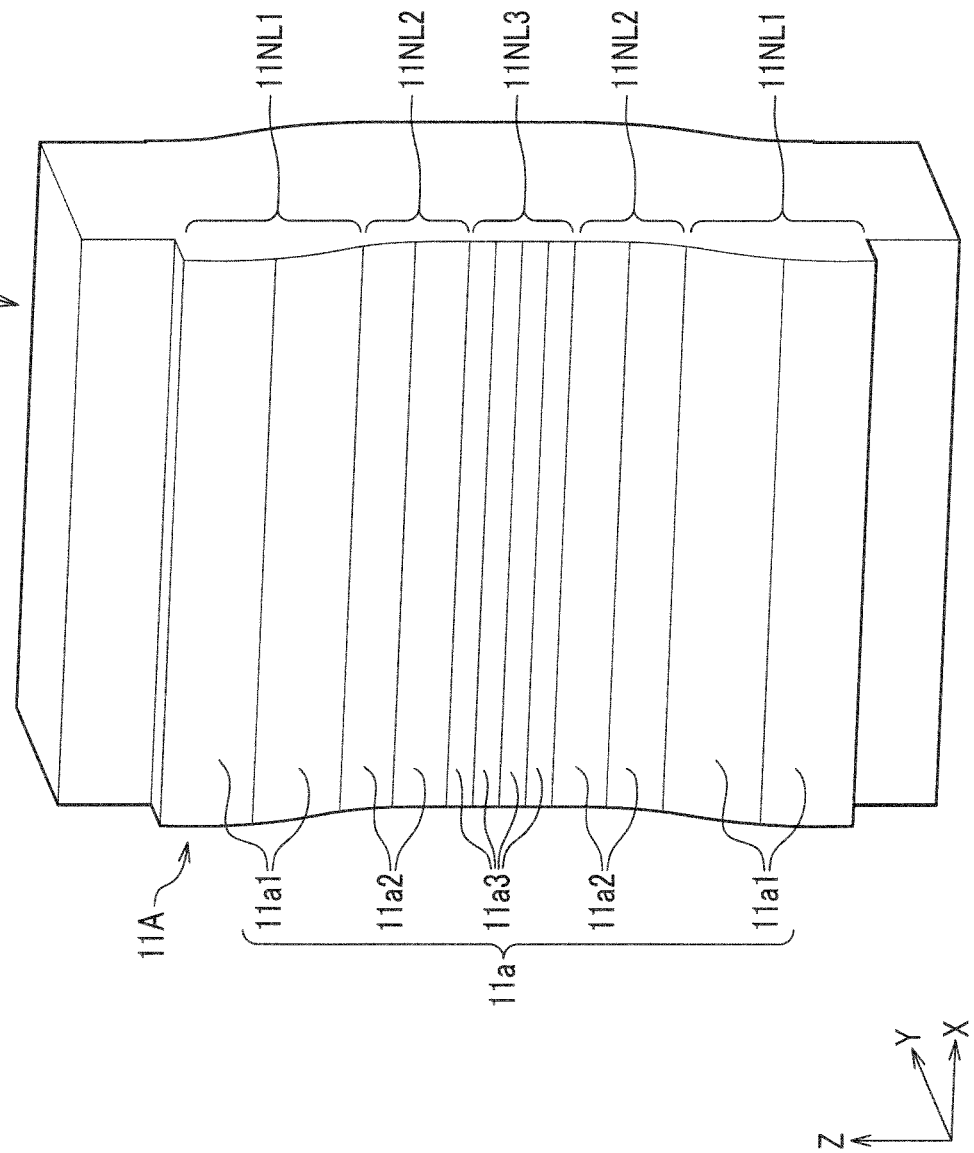
FIG. 3 is a perspective view schematically showing a side of an input-lens collective body in a lens array related to the first embodiment.
Figure 4:
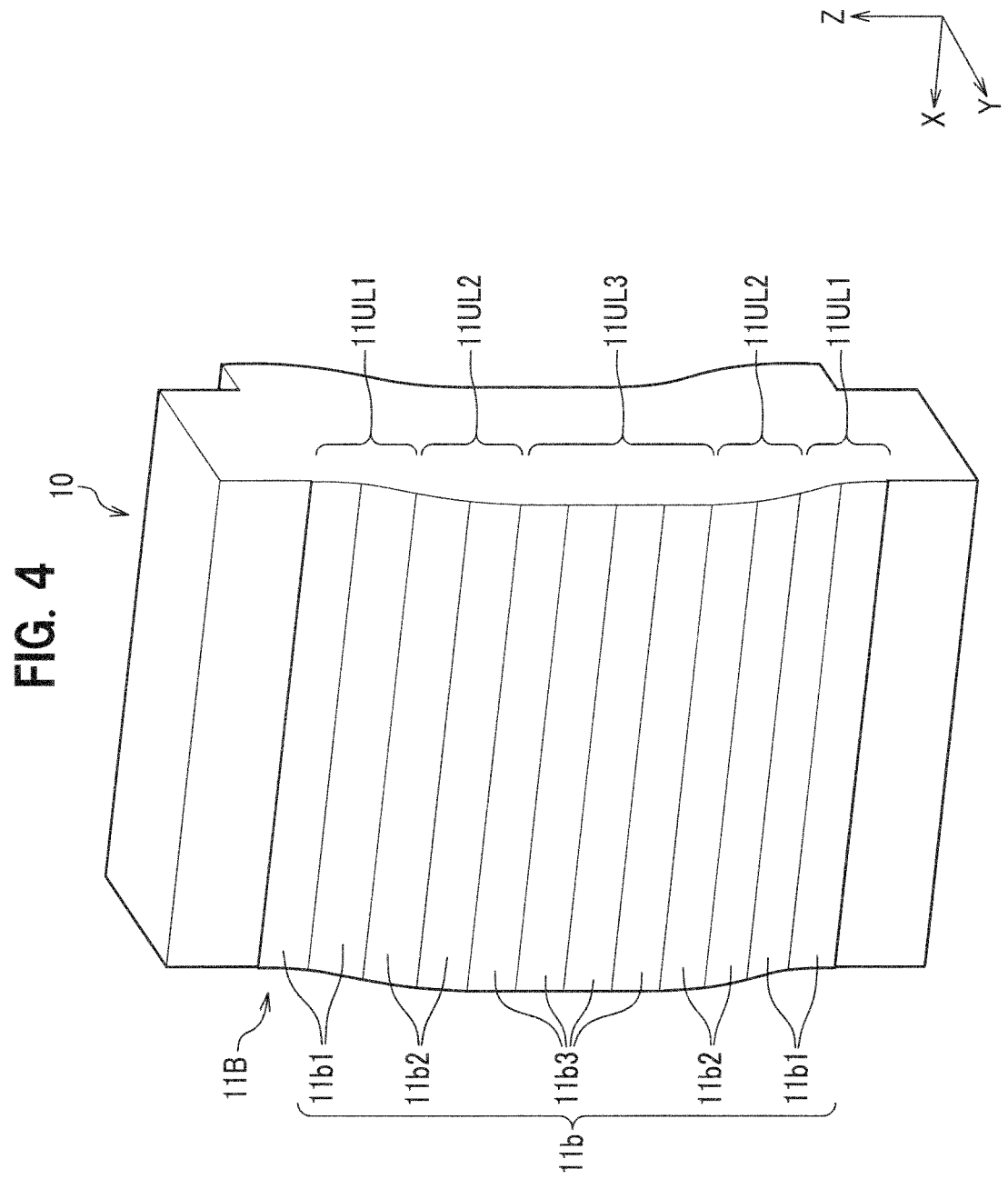
FIG. 4 is a perspective view schematically showing a side of an output-lens collective body in a lens array related to the first embodiment.

As shown in FIGS. 1 to 3, the first input lens 11a1 is formed so that a lens protruding end portion TLa (refer to FIG. 5) of the convex cylindrical lens is at a position allowing light to enter the optically opposing output lens 11b1. In the present embodiment, the first input lens 11a1 is formed so that light is delivered to the first output lens 11b1 which outputs the light to the first irradiated area E1. One or a plurality of first input lens 11a1 having the same vertical width and the same lateral width are arranged and vertically aligned. As an example, a predetermined number of the first input lenses 11a1 (e.g., first and second ones) are arranged from both upper and lower ends of the input-lens collective body 11A. Multiple first input lenses 11a1 are arranged as a first input lens group 11NL1 at both of the upper and the lower ends. The first input lens group 11NL1 is formed by aligning first input lenses 11a1 each having the same vertical width and the same lateral width. The first input lens groups 11NL1 are arranged at two vertical positions symmetrically from the lens plane center CL in the vertical direction.

In the first input lens group 11NL1, the lens protruding end portion TLa is formed so that the light from the first input lens 11a1 enters an opposing first output lens 11b1 of the first output lens group 11UL1. In the input lens 11a, an amount of eccentricity is set so that the light from the input lens 11a enters the optically opposing output lens 11b, and the lens size is determined so that an irradiated area is set. More specifically, when the center of the first output lens 11b1 is arranged to oppose the center of the first input lens 11a1, the first input lens 11a1 is formed without eccentricity so that the position of the lens protruding end portion TLa is coincident with the lens center of the first input lens 11a1. When the center of the first input lens 11a1 is not arranged to oppose the center of the first output lens 11b1, the first input lens 11a1 is formed to adjust the eccentricity so that the position of the lens protruding end portion TLa is coincident with the optical axis connecting the center of the first input lens 11a and the center of the first output lens 11b1. The size of the first input lens 11a1 is determined so that the vertical lens width defines the vertical size of the first irradiated area E1 and that a predetermined lateral lens width specifies the lens size. In this connection, the first irradiated area E1 is formed as a summed-up irradiation zone of a plurality of the first input lenses 11a1 which have substantially similar shapes corresponding to the width of the first input lenses 11a1 and are stacked and aligned vertically. The vertical lens width of each first input lens 11a is reflected correspondingly to the vertical size of each irradiation zone having substantially similar shapes. The lateral lens width of the input lens 11a determines a mechanical size of the lens. The lateral size of the irradiated area is dependent on the incident angle of the light in the input lens 11a, and the incident angle is reflected to the lateral size of the irradiated area.

Second Input Lens

The second input lens 11a2 is formed so that the position of the lens protruding end portion TLa enables light to be input to the opposing output lens 11b2. In the present embodiment, the second input lens 11a2 is formed so that light is delivered to the second output lens 11b2 which outputs the light to the second irradiated area E2. For the second input lens 11a2, a convex cylindrical lens having the same lateral lens width as the first input lens 11a1 and the smaller vertical lens width than the first input lens 11a1 is employed. The second input lens 11a2 is aligned and is vertically symmetrical in the upper and lower directions to the lens plane center CL of the input-lens collective body 11A.

As shown in FIG. 2 and FIG. 3, the number of the second input lens 11a2 can be one or more. As an example, the second input lenses 11a2 having the same vertical lens width and the same lateral lens width can be aligned in the vertical direction. In the input-lens collective body 11A, a predetermined number of the second input lens 11a2 (e.g., third and fourth ones) are arranged from upper and lower sides continuous to the first input lens 11a1. Two second input lenses 11a2 form a second input lens group 11NL2. The second input lens group 11NL2 is formed by aligning the second input lenses 11a2 having the same vertical lens width and the same lateral lens width. The second input lens group 11NL2 is arranged at two separate locations so as to be vertically symmetrical with reference to the lens plane center CL. Regarding the relation between the size of the second input lens 11a2 as well as the incident angle of the light and the second irradiated area E2, and regarding the amount of eccentricity adjustment of the lens protruding end portion TLa, they are the same as or similar to those as already explained for the first input lens 11a1.

Third Input Lens

The third input lens 11a3 is formed so that the position of the lens protruding end portion TLa enables the light to be inputted to an optically opposing third output lens 11b3. In the present embodiment, the third input lens 11a3 is formed so that light is delivered to the third output lens 11b3 which outputs the light to the third irradiated area E3. The third input lens 11a3 is formed with a vertical lens width smaller than the second input lens 11a2. The third input lens 11a3 is arranged with a predetermined number of aligned lenses having a same vertical width (e.g., from fifth to eighth ones).

Multiple third input lenses 11a3 (4 lenses in this case) are arranged as a third input lens group 11NL3 and arranged at center in the vertical direction of the input-lens collective body 11A. The third input lens group 11NL3 is formed by aligning the third input lenses 11a3 having the same vertical lens width and the same lateral lens width. The third input lens group 11NL3 is arranged to be vertically symmetrical with reference to the lens plane center CL.

In the third input lens group 11NL3, the lens protruding end portion TLa is formed to enable that the light from the third input lens 11a3 to be inputted to the opposing third output lens 11b3 of the third output lens group 11UL3. Regarding the relation between the size of the third input lens 11a3 as well as the incident angle of the light and the third irradiated area E3, and regarding the amount of eccentricity adjustment of the lens protruding end portion TLa, they are the same as or similar to those as already explained for the first input lens 11a1.

Although it has been explained that the eccentricity of the lens protruding end portion TLa is adjusted to input the light to the output lens 11b, the adjustment of the eccentricity includes also a case that the lens protruding end portion TLa is formed at a position on the optical axis connecting the input lens center and the output lens center. More specifically, it is acceptable if the lens protruding end portion TLa is so formed that the input lens 11a can deliver light to the opposing output lens 11b.

Output Lens

Next, the output lens 11b is explained in reference to FIGS. 1 to 8C. In the following explanation, all vertical lens widths and all lateral widths of the output lenses 11b arranged in the output-lens collective body 11B are assumed to have a same size (i.e., dimension).

The output lenses 11b output the light from the input lenses 11a to the irradiated region EA (refer to FIGS. 1, 6, 7) in a predetermined direction. As an example, the output lens 11b is arranged at position close to the focusing point of the input lens 11a, which focusing point is for light is refracted largely by the input lens 11a, more specifically which focusing point corresponds to refraction regarding a direction of the input lens 11a having a large optical power. In the present embodiment, a convex cylindrical lens is employed for the output lens 11b. The respective output lenses 11b are arranged vertically (Z-direction: other direction) so that the light from the respective optically opposing input lenses can enter thereto. The output lenses 11b include first output lenses 11b1, second output lenses 11b2, and third output lenses 11b3. The output-lens collective body 11B is formed by aligning the output lenses 11b, more specifically the first output lenses 11b1, the second output lenses 11b2, and the third output lenses 11b3 next to each other.

The shape of the lens plane becomes wavy in the output-lens collective body, when the output lenses 11b are aligned, as shown in FIG. 2. More specifically, in the output-lens collective body 11B, the lens plane shape is formed in a curved and wavy shape as seen in sideview, wherein the shapes of the output side convex curved surface 11RB1 and the output side concave curved surfaces 11RB2, 11RB3 are continuously formed. As a result, the output-lens collective body 11B has a shape, in which the output side convex curved surface 11RB1 is formed around the lens plane center CL and the output side concave curved surfaces 11RB2, 11RB3, are respectively formed upper side and lower side of the output side convex curved surface 11RB1. The lens plane of the output-lens collective body 11B is formed to be approximately parallel to the lens plane of the input-lens collective body 11A. The output-lens collective body 11B is arranged so that the light from the output lenses 11b are irradiated to the irradiated region EA via the optical system.

First Output Lens

As shown in FIGS. 1 to 3, the first output lens 11b1 is for outputting light to irradiate the first irradiated area E1 with the light from the first input lens 11a1. The number of the first output lens 11b1 can be one or more. In the case in which the output-lens collective body includes multiple first output lenses 11b1, the first output lenses 11b1 respectively having the same shape can be aligned. As an example, in the output-lens collective body 11B, ones of the first output lenses 11b1 are aligned as the first and the second ones from the upper end and other ones of the first output lenses 11b1 are aligned as the first and the second ones from the lower end of the output-lens collective body 11B. Multiple first output lenses 11b1 (two lenses in this case) configure the first output lens group 11UL1, and are arranged at both of the upper end and the lower end of the output-lens collective body 11B. The first output lens group 11UL1 is formed by aligning the first output lenses 11b1 having the same vertical lens width and the same lateral lens width. The first output lens groups 11UL1 are arranged in the vertical direction at two locations separated from each other so as to be vertically symmetrical with reference to the lens plane center CL.

First Output Lens and its Irradiated Area

The lens protruding end portion TLb of each first output lens 11b1 of the first output lens group 11UL1 is formed to output the light from the first input lens 11a1 to the first irradiated area E1 in the irradiated plane. In the first output lens groups 11UL1, the lens protruding end portion TLb of each first output lens 11b1 is formed so that the light irradiated from the upper-end output lens and light irradiated form the lower-end output lens of the output-lens collective body 11B overlap in the first irradiated area E1.

Figure 8A:
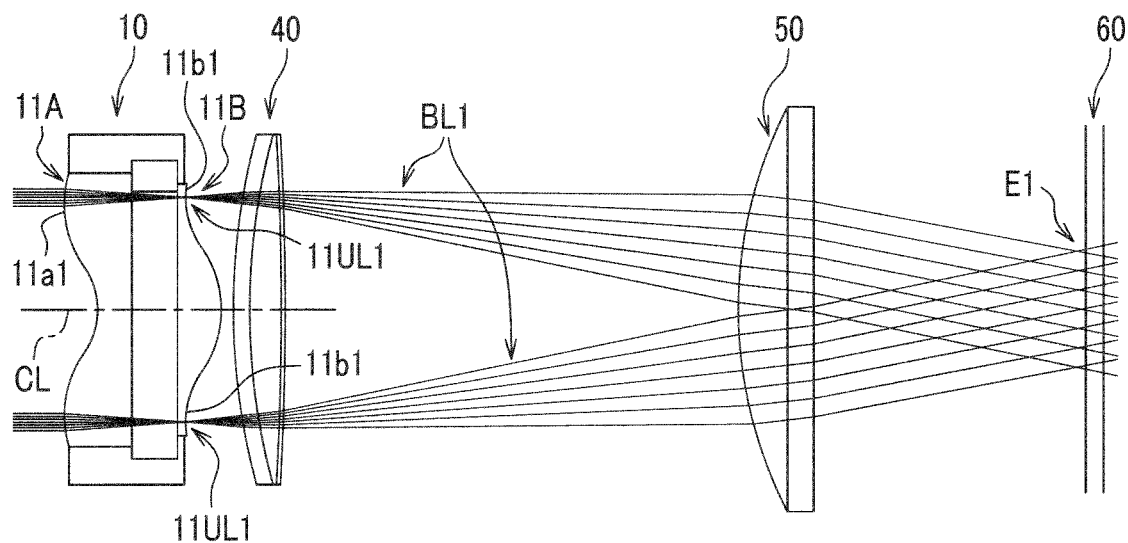
FIG. 8A is an explanatory figure showing a vertical irradiated position in an irradiated area of light outputted from a first output-lens group of the lens array related to the first embodiment.

As shown in FIG. 8A, the first output lens groups 11UL1 are formed symmetrically to the lens plane center CL at two locations of the lens array 10, thus the light from the first output lens groups 11UL1 at the two locations form the first irradiated area E1.

Second Output Lens

The second output lens 11b2 is a member for outputting the light from the second input lens 11a2 to irradiate the second irradiated area E2. The number of the second output lens 11b2 can be one or more. In the case in which the output-lens collective body 11B includes multiple second output lens 11b2, the second output lenses 11b2 having the same shape can be aligned. As an example, in the output-lens collective body 11B, ones of the second output lenses 11b2 are aligned as the third and the fourth ones from the upper end and other ones of the second output lenses 11b2 are aligned as the third and the fourth ones from the lower end of the output-lens collective body 11B. Multiple second output lenses 11b2 (two lenses in this case) configure the second output lens group 11UL2, and are arranged at two locations continued from the first output lens group 11UL1 at the upper end and from the lower end of the output-lens collective body 11B. The second output lens groups 11UL2 are arranged in the vertical direction at two locations separated from each other so as to be vertically symmetrical with reference to the lens plane center CL.

Second Output Lens and its Irradiated Area

Figure 8B:
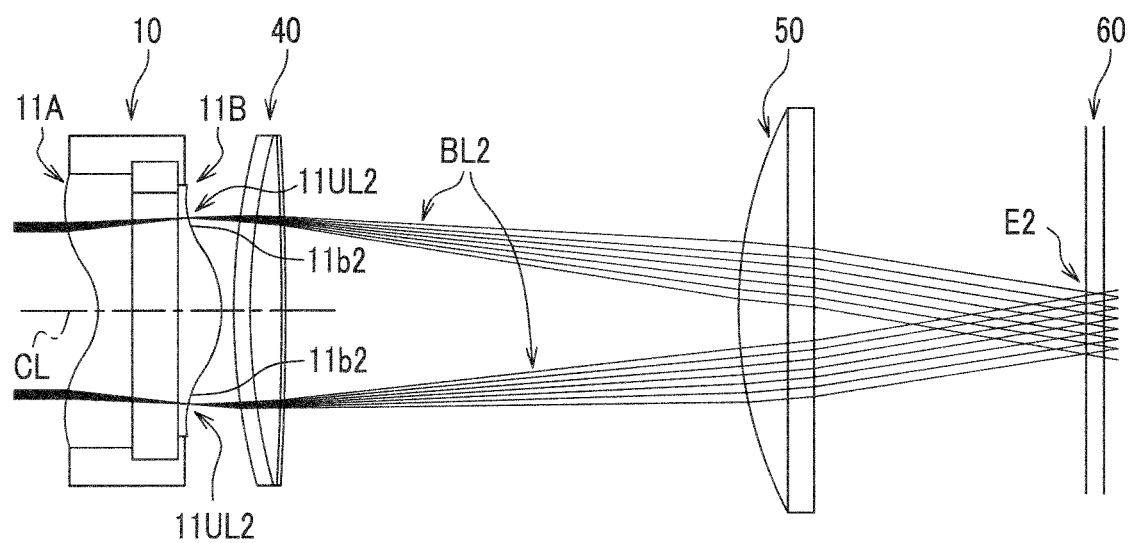
FIG. 8B is an explanatory figure showing a vertical irradiated position in an irradiated area of light outputted from a second output-lens group of the lens array related to the first embodiment.

As shown in FIG. 1 and FIG. 8B, in the second output lens group 11UL2, the second output lens 11b2 is formed to have an eccentric position of the lens protruding end portion TLb, thereby enabling irradiation of light to the second irradiated area E2. Further, the second irradiated area E2 is formed by collection of irradiated light from the respective second output lenses 11b2 of the second output lens groups 11UL2 at two locations of the output-lens collective body 11B.

Third Output Lens

The third output lens 11b3 is a member for outputting the light from the third input lens 11a3 to irradiate the third irradiated area E3. The number of the third output lens 11b3 can be one or more. In the case in which the output-lens collective body 11B includes multiple third output lenses 11b3, the third output lenses 11b3 having the same shape can respectively be aligned. As an example, in the output-lens collective body 11B, ones of the third output lenses 11b2 are aligned as the fifth and the sixth ones from the upper end and other ones of the third output lenses 11b2 are aligned as the fifth and the sixth ones from the lower end of the output-lens collective body 11B. More specifically, four third output lenses 11b3 are continuously arranged at the center of the output-lens collective body 11B. Multiple third output lenses 11b3 (four lenses in this case) configure the single third output lens group 11UL3, and are arranged at the center of the output-lens collective body 11B, being continued to the second output lens group 11UL2. The third output lens group 11UL3 is arranged continuously so as to be vertically symmetrical with reference to the lens plane center CL.

Third Output Lens and its Irradiated Area

Figure 8C:
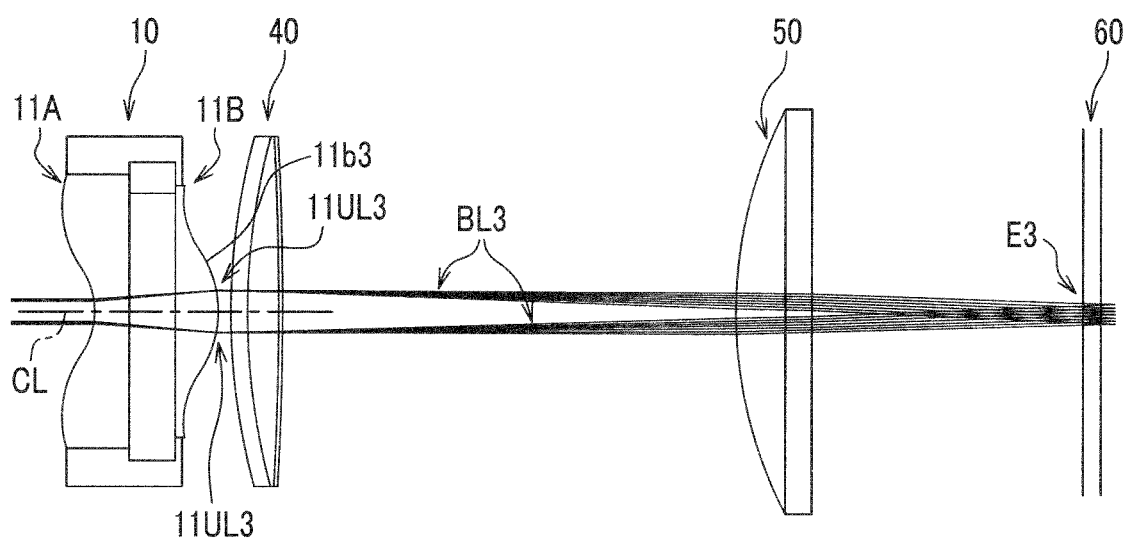
FIG. 8C is an explanatory figure showing a vertical irradiated position in an irradiated area of light outputted from a third output-lens group of the lens array related to the first embodiment.

As shown in FIG. 1 and FIG. 8C, in the third output lens group 11UL3, the third output lens 11b3 is formed to have the lens protruding end portion TLb enabling irradiation of light to the third irradiated area E3. The third irradiated area E3 is formed by collecting of irradiated light from the respective third output lenses 11b3 of the third output lens groups 11UL3 at the center the output-lens collective body 11B.

Irradiated Region and Irradiated Area

As shown in FIG. 1, FIG. 8A, the irradiated region EA is set to be the same size as the first irradiated area E1 in the irradiated plane. In FIG. 1, because the lines showing the irradiated region EA and the first irradiated area E1 overlap with each other and are difficult to recognize, these lines are shown shifted relative to each other. The irradiated region EA is formed by assembly of the first to third irradiated areas E1 to E3 so that these areas overlap at least partially. As an example, in the irradiated region EA, the center portions of the first irradiated area E1, the second irradiated area E2, and the third irradiated area E3 are adjusted to be overlapped, whereby the center of the irradiated region EA has a highest irradiation intensity. More specifically, in the input-lens collective body 11A, the vertical lens widths of respective input lenses 11a are set so that the respective input lenses 11a provide the respective vertical irradiation widths of the first irradiated area E1, the second irradiated area E2, and the third irradiated area E3. In the output-lens collective body 11B, the respective lens protruding end portion TLb of each output lenses 11b is formed so that the first irradiated area E1, the second irradiated area E2, and the third irradiated area E3 have a common center.

Irradiated Region

In the case in which the input lenses exhibit the optical powers (i.e., light-collecting power) different for one direction and for the other direction, for example, which is a cylindrical lens, the irradiated region EA is defined in such a way that the lateral irradiated range is determined by the incident angle of light entering the input lens 11a, and the vertical irradiated range is determined by the vertical lens width. Although, in the lens array 10, it is assumed that the light is inputted as a parallel light, the light source has a certain broadening because the light source is an LED which is not a point source, and therefore an incident angle of the light is produced, which incident angle determines the lateral range of the first to third irradiated areas E1 to E3. In the lens array 10, the vertical irradiation width of the first irradiated area E1 is determined by the vertical lens widths of the respective first input lenses 11a1 of a plurality of input lens group 11NL1, and the irradiation direction is determined by the position of the lens protruding end portion TLb of the first output lens 11b1.

As a result, in the lens array 10, the irradiation intensity can be made higher at the center of the whole irradiated region EA and can be made lower as approaching to the upper and lower ends of the irradiated region EA. This can provide an output light having a desired gradation distribution.

As shown in FIGS. 8A to 8C, the first irradiated area E1 is set to have a size equal to the rectangular irradiated region EA and is formed by collecting the light irradiated from the first output lens groups 11UL1 arranged at two locations, upper and lower locations of the lens array 10. Similarly, the second irradiated area E2 is formed by collecting the light irradiated from the second output lens groups 11UL2 (arranged at two locations, upper and lower locations of the lens array 10) in direction to the central region of the rectangular irradiated region EA. Similarly, the third irradiated area E3 is formed by collecting the light irradiated from the third output lens groups 11UL3 in direction to the central region of the rectangular irradiated region EA.

Therefore, with the lens array 10, the irradiation intensity in the whole irradiated region can be easily adjusted to have such a distribution that the irradiation intensity is higher around the region center HCL and is decreased as approaching to upper and lower sides of the region. The vertical ranges of the second and the third irradiated areas E2, E3 are set to less than 50% of the first irradiated area E1. This can facilitate the adjustment of the irradiation intensity distribution, thereby increasing a setting flexibility.

In the lens array 10, the respective lens groups and respective lenses are arranged so as to be vertically symmetrical with reference to the lens plane center CL. The first, second and third output lenses 11b1, 11b2, 11b3 have the same lateral lens width and the same vertical lens width. This can facilitate aligning and adjoining the respective lenses when the lens array 10 is formed.

Although it has been explained that the lens array 10 includes three types of input lens groups, each including input lenses having different vertical lens widths to each other, are used on the input side, the number of the types of the input lens groups is not limited, and thus, for example, it is acceptable if the number is two or more, for example four to ten.

Although it has been explained that the output lenses are formed to have the same vertical lens width on the output side, these output lenses can be formed to have the same vertical lens width as the corresponding input lenses.

In the output-lens collective body 11B including the output lenses as above, the lens plane shape is different in correspondence to the alignment order of the output lenses 11*b* having different vertical lens widths. More specifically, in the output-lens collective body 11B, the third output lenses 11*b*3 having a smaller vertical lens width are arranged at the lens plane center CL, and the second output lenses 11*b*2 and the first output lenses 11*b*1 are arranged so that the vertical lens widths become smaller as approaching from the lens plane center CL to the upper and lower ends of the output-lens collective body 11B.

Variation Example of Lens Array

The lens array can be formed like the variation examples explained below. In the first to fourth variation examples of the lens array, the first, second and third output lenses 11*b*1, 11*b*2, 11*b*3 are formed to have a same vertical lens width as an example.

The lens array explained below is formed by exchanging the alignment order of the lens groups of the input-lens collective body 11A.

For example, in the lens array of a first variation example, the second input lens group 11NL2 of the second input lenses 11*a*2 having an intermediate vertical lens width can be arranged around the lens plane center CL, and the third input lens groups 11NL3 of the third input lenses 11*a*3 having the smallest vertical lens width can be respectively arranged upper side and lower side of the second input lens group 11NL2. In the lens array, the first input lens groups 11NL1 of the first input lenses 11*a*1 having the largest vertical lens width can be respectively arranged upper side of the upper third input lens group 11NL3 and lower side of the lower third input lens group 11NL3. In this lens array, the respective lens groups are arranged so as to be vertically symmetrical with reference to the lens plane center CL.

In the lens array of a second variation example, the third input lens groups 11NL3 of the third input lenses 11*a*3 having the smallest vertical lens width can be arranged around the lens plane center CL, and the first input lens groups 11NL1 of the first input lenses 11*a*1 having the largest vertical lens width can be respectively arranged upper side and lower side of the third input lens groups 11NL3. In the lens array, the second input lens groups 11NL2 of the second input lenses 11*a*2 having an intermediate vertical lens width can be respectively arranged upper side of the upper first input lens group 11NL1 and lower side of the lower first input lens group 11NL1. In this lens array, the respective lens groups are arranged so as to be vertically symmetric with reference to the lens plane center CL.

In the lens array of a third variation example, the first input lens group 11NL1 of the first input lenses 11*a*1 having the largest vertical lens width can be arranged around the lens plane center CL, and the second input lens groups 11NL2 of the second input lenses 11*a*2 having an intermediate vertical lens width can be respectively arranged upper side and lower side of the first input lens group 11NL1. In the lens array, the third input lens groups 11NL3 of the third input lenses 11*a*3 having the smallest vertical lens width can be respectively arranged upper side of the upper second input lens group 11NL2 and lower side of the lower first input lens group 11NL2. In this lens array, the respective lens groups are arranged so as to be vertically symmetrical with reference to the lens plane center CL.

In the lens array of a fourth variation example, the second input lens group 11NL2 of the second input lenses 11*a*2 having an intermediate vertical lens width can be arranged around the lens plane center CL, and the first input lens groups 11NL1 of the first input lenses 11*a*1 having the largest vertical lens width can be respectively arranged on the upper side and on the lower side of the first input lens group 11NL2. In the lens array, the third input lens groups 11NL3 of the third input lenses 11*a*3 having the smallest vertical lens width can be respectively arranged on the upper side of the upper first input lens group 11NL1 and on the lower side of the lower first input lens group 11NL1. In this lens array, the respective lens groups are arranged so as to be vertically symmetric with reference to the lens plane center CL.

In the respective first to fourth variation examples explained above, the lens array is configured as three types of input lens groups each including input lenses having a different vertical lens width from other lens groups.

This can allow the lens array to emit light, for example, to irradiate the irradiated areas E1, E2, E3 of irradiated region EA as shown in FIG. 1, by adjusting the amount of the eccentricity of the lens protruding end portion TLb of the output lenses 11*b*1.

Figure 9A:
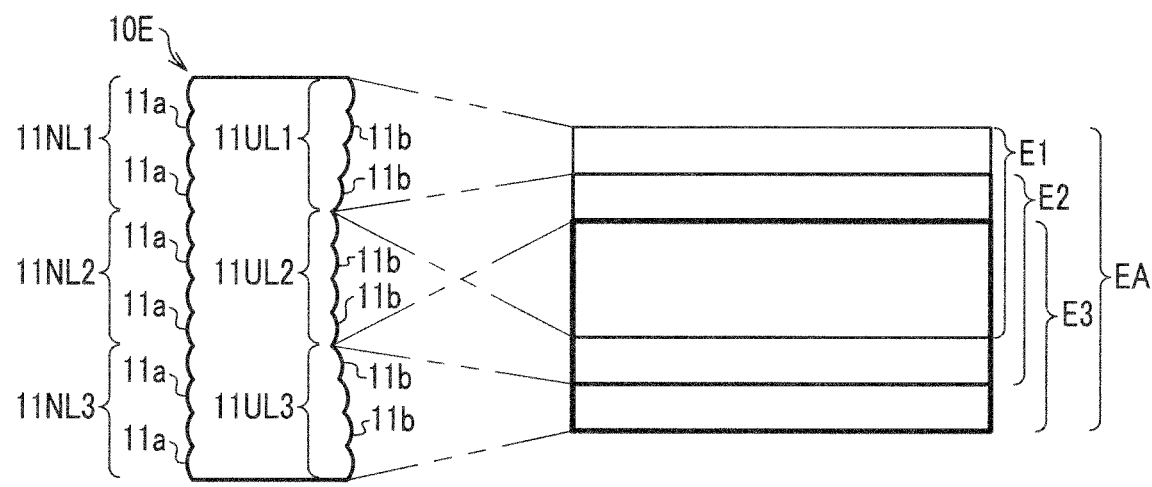
FIG. 9A is a schematic figure showing a fifth variation in which the input-lens collective body is configured with input lenses having the same vertical width and the output-lens collective body is configured with output lenses having the same width but different to the input lenses.
Figure 9B:
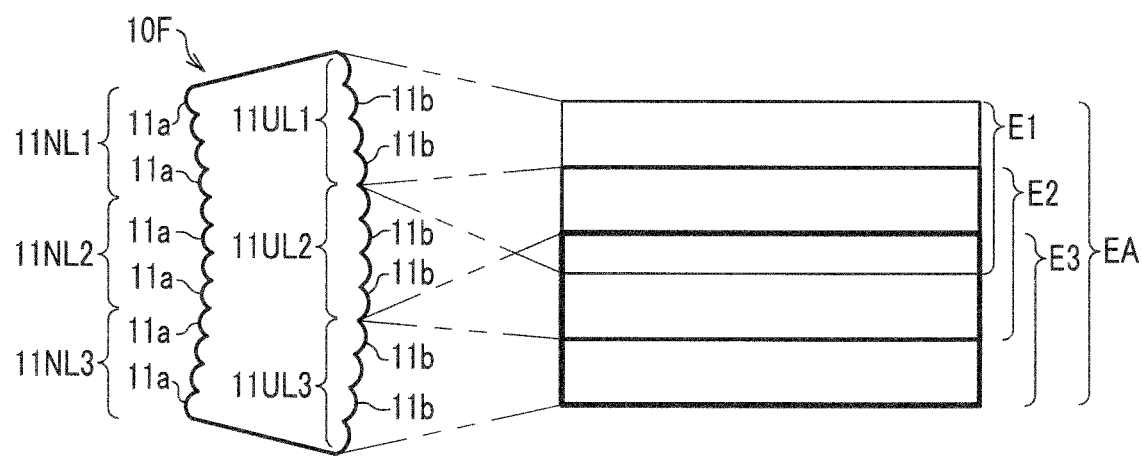
FIG. 9B is a schematic figure showing a sixth variation in which the input-lens collective body is configured with input lenses having the same width and the output-lens collective body is configured with output lenses having the same width but different to the input lenses.

The lens array can be configured as shown in FIG. 9A and FIG. 9B. As an example, in reference to FIG. 9A, explanations are given assuming the input lenses to have a same vertical lens width and also assuming the output lenses to have a same vertical lens width. As an example, in reference to FIG. 9B, explanations are given assuming the input lenses to have the same vertical lens width and also assuming the output lenses to have the same vertical lens width, as well as assuming smaller vertical lens widths for the input lenses than for the output lenses.

As shown in FIG. 9A, the lens array 10E is formed by configuring the input lenses 11*a* having the same vertical lens width and output lenses 11*b* having the same vertical lens width vertically aligned. In the lens array 10E, the lens protruding end portions TLb of the output lenses 11*b* are formed so that the first irradiated area E1, the second irradiated area E2 and the third irradiated area E3 are arranged to be gradually shifted upwards in this order. The irradiated region EA is defined by gathering the first, second and third irradiated areas E1, E2, E3. The first to third irradiated areas E1-E3 are arranged so that these areas overlap partially, and the irradiation intensity becomes highest at the center of the irradiated region EA. The output lens plane of the lens array 10E is formed to have a concave shape as a whole in which the center thereof is recessed relative to the upper and lower ends.

As shown in FIG. 9B, the lens array 10F is formed by configuring the input lenses 11*a* vertically aligned and having the same vertical width, and the output lenses 11*b* vertically aligned and having the same vertical lens width. The vertical lens width of the input lenses is smaller than that of the output lenses. In the lens array 10F, the input lens plane and the output lens plane are formed as approximately concentric circular arcs. Assuming the irradiated range EA is the same size for FIGS. 9A and 9B, the irradiation intensity of the first to third irradiated areas are higher in the lens array 10F than those of the lens array 10E. This is because the vertical lens width of the input lenses 11a in the lens array 10F is smaller than that in the lens array 10E, and because the vertical lens width of the output lenses 11b is the same for the lens array 10E and for the lens array 10F, whereby the vertical width of the irradiated plane becomes smaller with respect to the lens array 10E Accordingly, the irradiation intensity in a portion where the irradiated areas overlap with each other can be made higher in the lens array 10F than in the lens array 10E.

Figure 10A:
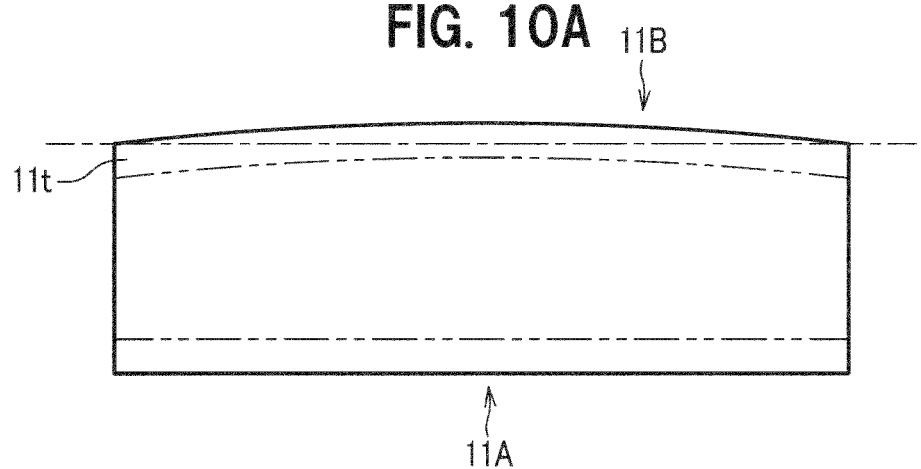
FIG. 10A is an explanatory figure schematically showing an example in which the input lenses or output lenses of the lens array have toroidal lens shape.
Figure 10B:
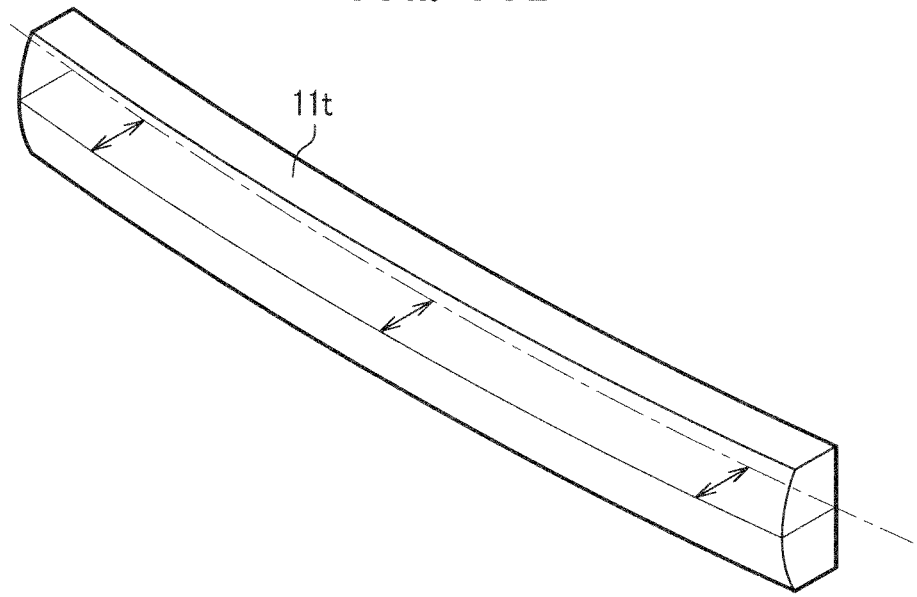
FIG. 10B is a perspective view showing a structure of a toroidal lens.
Figure 10C:
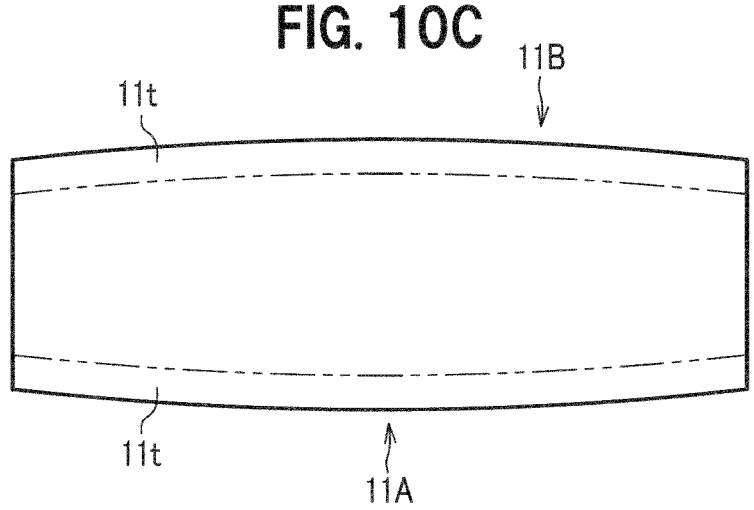
FIG. 10C is an explanatory figure schematically showing an example in a plan view in which both the input lenses and output lenses of the lens array have toroidal lens shape.

Although the above explanations are given for the examples in which the lens array 10 is formed by employing cylindrical lenses, a toroidal lens lit can be used as shown in FIGS. 10A to 10C. The toroidal lens lit can be used for the input and/or output lenses. In the lens arrays 10, 10A to 10F, when a toroidal lens lit is employed, a lens having the same curvature along the lateral direction can be used for the input and/or output lenses. The toroidal lens lit has a larger curvature, more specifically a larger light-collecting power, along vertical direction, and has a smaller curvature, more specifically a smaller light-collecting power, along lateral direction perpendicular to the vertical direction.

Figure 11:
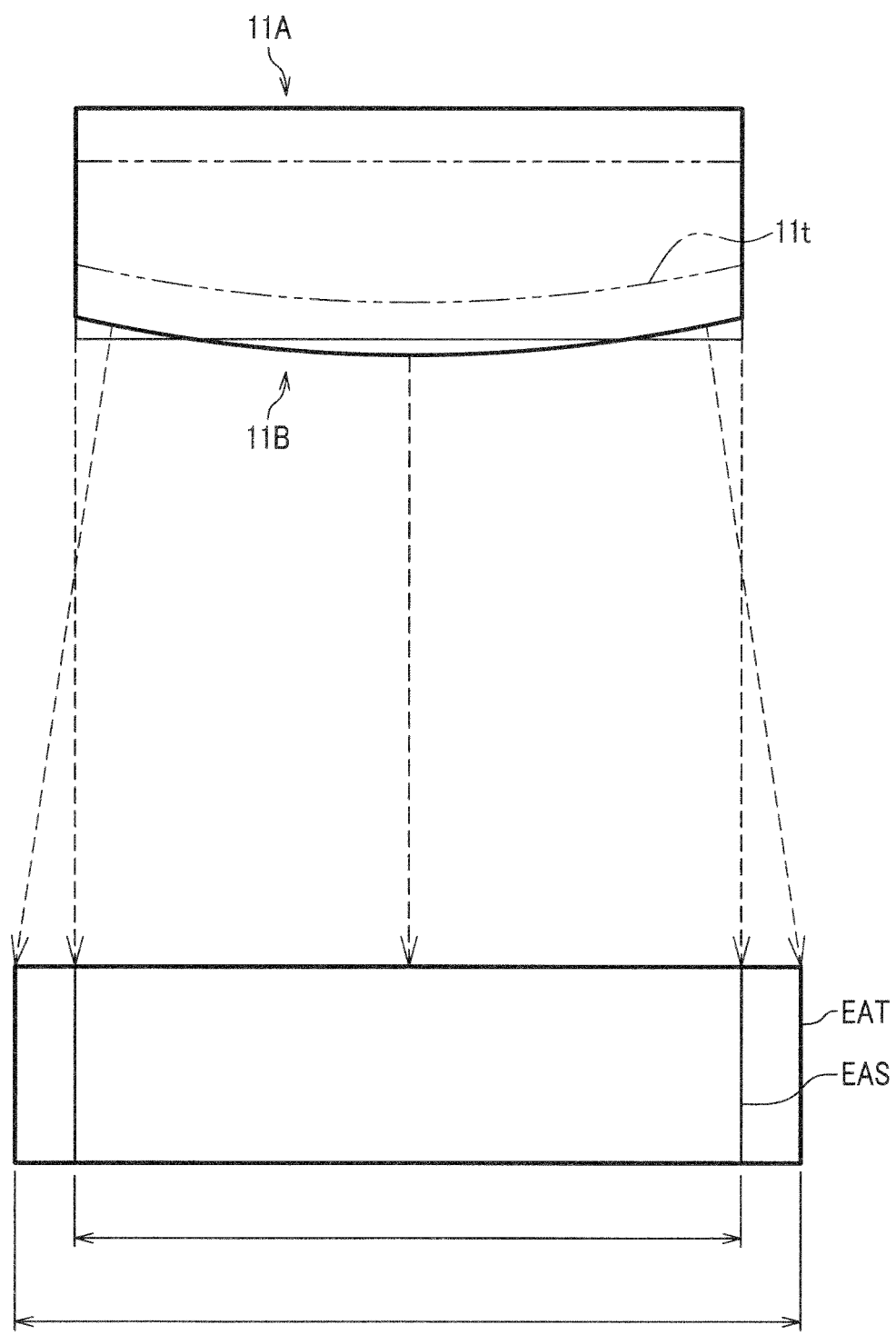
FIG. 11 is an explanatory figure showing a relation between the irradiated region of light outputted from a toroidal lens and an irradiated region of light outputted from a cylindrical lens.

As shown in FIG. 11, when a toroidal lens lit is used for the output lens 11b, the size of the irradiated region EAT in the lateral direction irradiated with the toroidal lens lit can be made larger than the size of the irradiated region EAS irradiated with the cylindrical lens.

As shown in FIG. 10C, when a toroidal lens is used for the input lens and for the output lens, an even wider irradiated region EA can be achieved than in the case of using a cylindrical lens.

Configuration of Irradiated Region as an Application

Figure 12A:
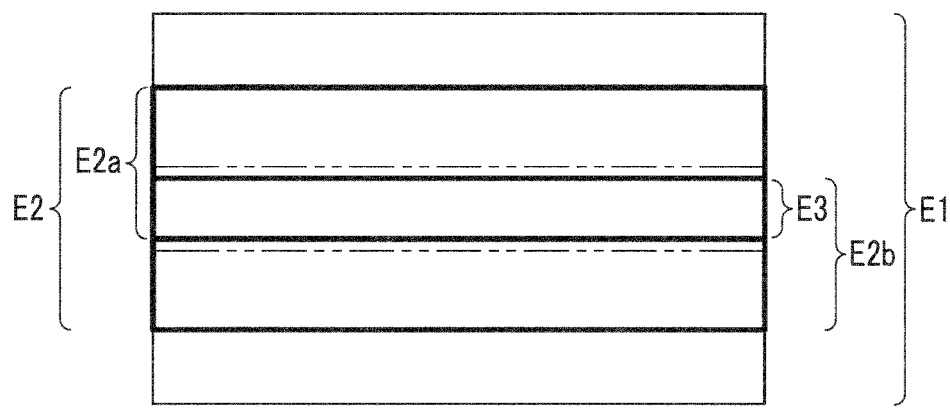
FIG. 12A is a figure schematically showing an irradiated region formed by a first variation example of the irradiated areas.
Figure 12B:
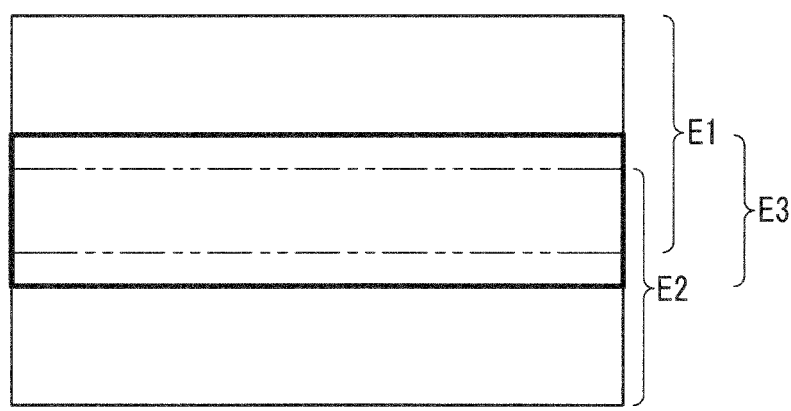
FIG. 12B is a figure schematically showing an irradiated region formed by a second variation example of the irradiated areas.
Figure 12C:
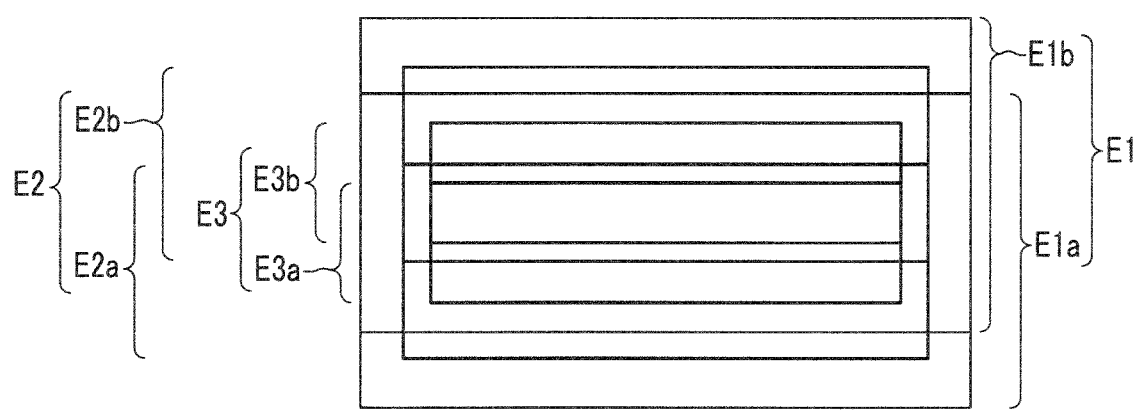
FIG. 12C is a figure schematically showing an irradiated region formed by a third variation example of the irradiated areas.

In the lens arrays 10, 10E, 10F, the irradiated region EA including the first to third irradiated areas E1-E3 is explained as an example. However, for example as shown in FIGS. 12A to 12C, the irradiated region can also be formed by gathering a plurality of irradiated areas or a plurality of irradiated areas each having a different size. Although, in FIG. 12C, the lateral sizes of the irradiated areas are modified, because the lines showing the areas overlap with each other, and become difficult to recognize them, the explanations are given assuming the areas to have the same lateral size. In the explanation below, the input-lens collective body 11A and the output-lens collective body 11B are assumed to be configured with single lenses for simplicity (these collective bodies are not shown). However, it may be apparent that a lens group including a plurality of lenses can be used in place of each single lens.

For example, as shown in FIG. 12A, the second irradiated area E2 can be formed by gathering a first irradiated section E2a and a second irradiated section E2b. In this case, for example, in the case of the lens array 10, one of the two second output lenses 11b2 (i.e., one of second input lens groups 11NL2) is used for irradiating the first irradiated section E2a, and the other one of the two second output lenses 11b2 (i.e., the other one of second input lens groups 11NL2) is used for irradiating the second irradiated section E2b, whereby these irradiated sections are formed by adjusting the amount of eccentricity of the lens protruding end portions TLb.

As shown in FIG. 12B, it can also be arranged so that the first irradiated area E1 and the second irradiated area E2 cover the whole irradiated region EA, and the third irradiated area E3 increases the irradiation intensity of the center of the irradiated region EA. In this case, for example, these irradiated areas can be formed by an arrangement that the first input lens and the second input lens have the same vertical lens width, the third input lens has a smaller vertical lens width, and the amount of eccentricity of the lens protruding end portions TLb is adjusted for determining the irradiation direction.

As shown in FIG. 12C, the irradiated areas can be also arranged so that the first irradiated area E1 is formed by a first irradiated section E1a and a second irradiated section E1b, the second irradiated area E2 is formed by a first irradiated section E2a and a second irradiated section E2b, and the third irradiated area E3 is formed by a first irradiated section E3a and a second irradiated section E3b. In this case, for example, in the case of the lens array 10, these irradiated areas formed by an arrangement that one and the other one of the respective two lenses of first to third output lenses 11b1 to 11b3 are allocated to each first irradiated section and to each second irradiated section.

Figure 13A:
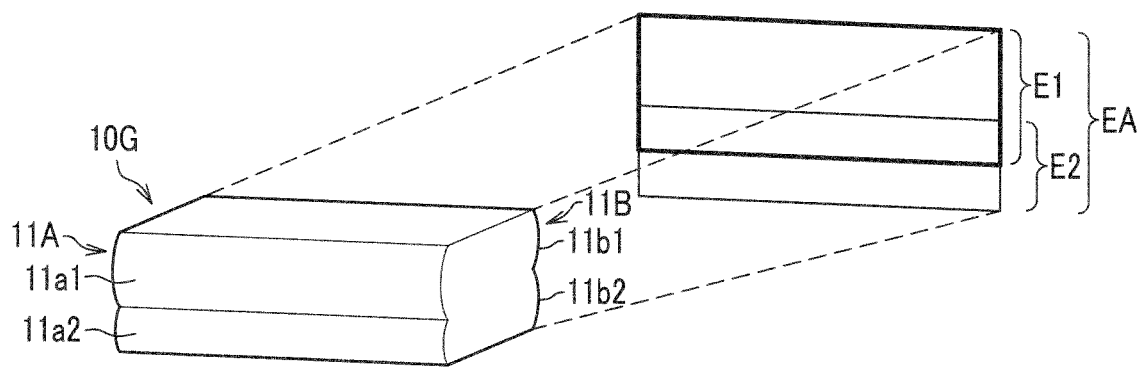
FIG. 13A is an explanatory figure schematically showing a seventh variation example of the lens array and irradiated areas thereof.
Figure 13B:
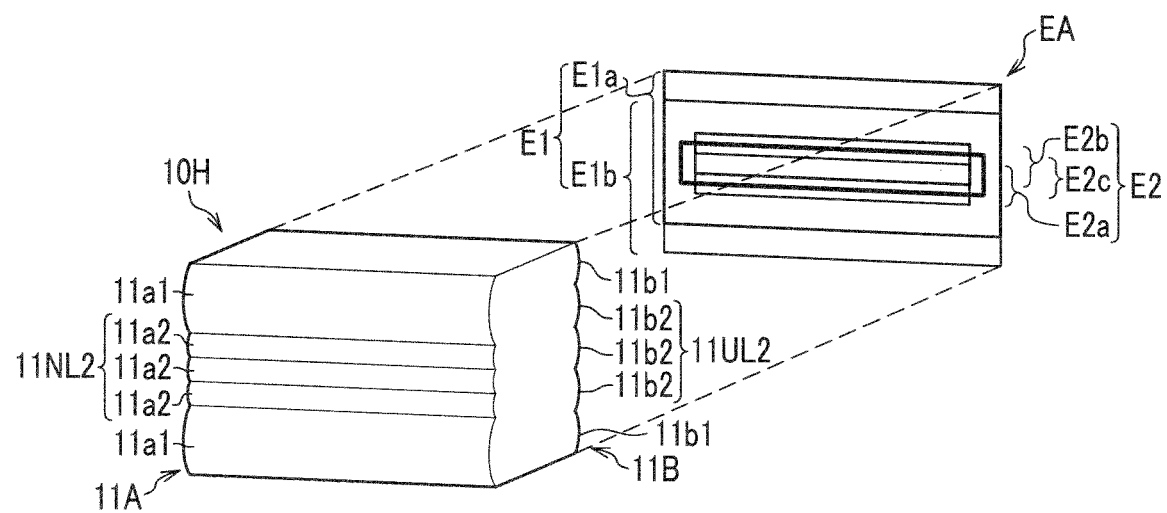
FIG. 13B is an explanatory figure schematically showing an eighth variation example of the lens array and irradiated areas thereof.

The configurations of the lens arrays 10G, 10E as shown in FIG. 13A and FIG. 13B are possible. In FIG. 13B, because the lines showing the irradiated areas E1 and E2 overlap each other and are difficult to recognize, the lateral sizes of these areas are arbitrarily changed, and, for explanation, the irradiation range is assumed as the same in lateral size.

As shown in FIG. 13A, in the lens array 10G, the input-lens collective body 11A is formed by the first input lens 11a1 and the second input lens 11a2, and the first input lens 11a1 is formed to have a larger vertical lens width than that of the second input lens 11a2. In the lens array 10G, the output-lens collective body 11B is formed by the output lenses 11b1, 11b2 each having the same vertical lens width.

The lens array 10G is arranged so that the light from the output lenses 11b1, 11b2 define a predetermined irradiated region EA in the irradiated plane, and the irradiated region EA is formed by the first irradiated area E1 and the second irradiated area E2. In addition, in the irradiated region EA, a portion of the first irradiated area E1 overlaps a portion of the second irradiated area E2. More specifically, in the lens array 10G, the lens protruding end portion TLb of one output lens 11b1 is formed so that the light is irradiated in direction to the first irradiated area E1, and the lens protruding end portion TLb of the other output lens 11b2 is formed so that the light irradiated in direction to the second irradiated area E2.

As shown in FIG. 13B, in the lens array 10H, the input-lens collective body 11A includes first input lenses 11a1 and second input lenses 11a2 which have different vertical lens widths to each other, and the output-lens collective body 11B includes output lenses 11b1, 11b2 having a same vertical lens width. The first input lenses 11a1 are disposed at the upper end and at the lower end of in the vertical direction in the input-lens collective body 11A. As the second input lenses 11a2, three lenses are arranged in vertical direction at the center of the input-lens collective body 11A. The second input lenses 11a2 as three lenses form the second input lens group 11NL2. The output lenses 11b1, 11b2 are formed so that the first output lenses 11b1 positioned at the upper end and at the lower end of the output-lens collective body 11B in vertical direction output the light from the input lens 11a1, and three output lenses 11b2 arranged at the center of the output-lens collective body 11B irradiate the light from the second input lenses 11a2. The three second output lenses 11b2 at the center of the output-lens collective body 11B form the second output lens group 11UL2. This lens array 10H is formed by single lenses and lens groups including a plurality of lenses.

The irradiated region EA of the lens array 10H is formed, for example, by gathering the first irradiated area E1 and the second irradiated area E2. The first irradiated area E1 is formed by the first irradiated section E1a and the second irradiated section E1b. The second irradiated area E2 is formed by the first irradiated section E2a, the second irradiated section E2b and the third irradiated section E2c.

In the lens array 10H, the amount of eccentricity of the lens protruding end portion TLb of one of the first output lenses 11b1 is adjusted to output the light to irradiate the first irradiated section E1a of the first irradiated area E1, and the amount of eccentricity of the lens protruding end portion TLb of the other one of the first output lenses 11b1 is adjusted to output the light to irradiate the second irradiated section E1b of the first irradiated area E1.

In the lens array 10H, the amount of eccentricities of the lens protruding end portion TLb of each second output lens 11b2 is adjusted so that they irradiate the light to the first, second, and third irradiated sections E2a, E2b, E2c of the second irradiated area E2, respectively.

As explained above, the lens array 10G shown in FIG. 13A can include two input lenses and two output lenses as a minimum configuration and can be configured by gathering single lenses. The lens array 10H shown in FIG. 13B can be formed by combination of single lenses and a lens group. Therefore, the respective lens arrays explained in reference to FIGS. 1 to 13B can be formed by single lenses alone, lens groups alone, or combination of single lenses and lens groups.

Lighting Optical System

Figure 14:
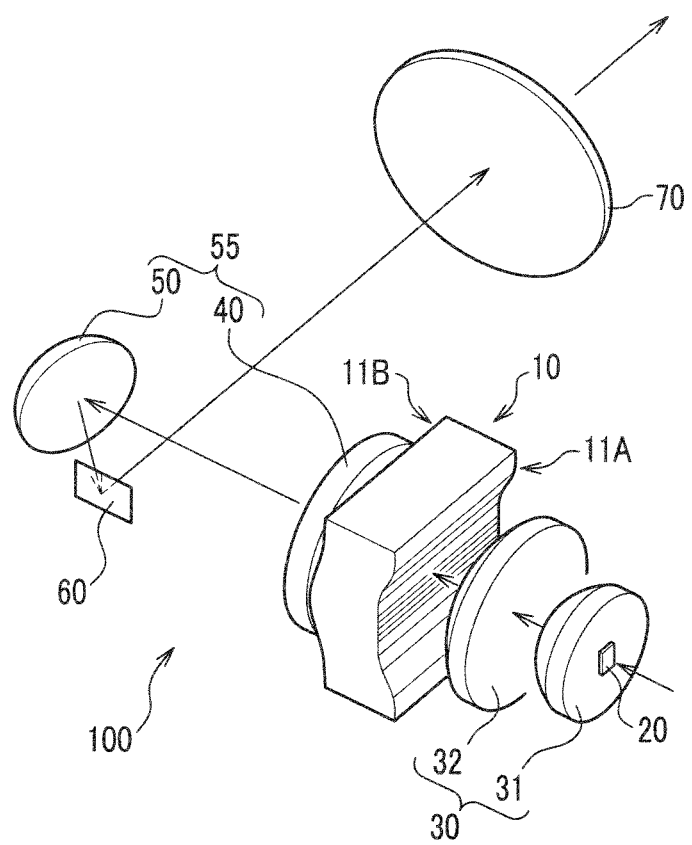
FIG. 14 is a perspective view schematically showing the entire lighting optical system related to the present embodiment.

Next, the lighting optical system 100 is explained in reference to FIG. 14. Although it will be explained here about a configuration including the lens array 10, it may be apparent that a lens array having another configuration can be also used.

The lighting optical system 100 is used, for example, as various lighting fixture for vehicle, ship, or airplane. The lighting optical system includes, for example, a first optical member 30 which is arranged in the light path of the light source 20 and converts the light from the light source 20 into approximately parallel light, a lens array 10 which outputs the light from the first optical member 30 as light having a desired distribution of irradiation intensity, a second optical member 55 which is arranged in the light path from the lens array 10, light modulator 60 which changes the light path of the light from the second optical member 55 and output the light, and a projection lens 70 which projects the light from the light modulator 60. The section from the light source 20 to the projection lens 70 is housed within a frame.

The light source 20 is configured to output a white light, for example. The light source 20 employs, for example, a light-emitting device in which light emitting elements are housed in a package provided with a transparent member. The light-emitting elements used in the present embodiment can be a known element such as a light-emitting diode or a laser diode. For the light-emitting elements, for example, as a light-emitting element for blue light and green light, a nitride semiconductor ($In_X Al_Y Ga_{1-X-Y}N$, $0 \leq X$, $0 \leq Y$, $X+Y \leq 1$) or a GaP semiconductor can be used. As a red light-emitting element, other semiconductors such as GaAlAs, AlInGaP can be used. A semiconductor light-emitting element fabricated from a material other than the aforementioned materials can also be used. That the light-emitting element can be appropriately selected regarding its material composition, emission color, size, quantity, etc., according to a purpose for use.

The package is configured with conductive materials such as a lead frame, wirings used for mounting the light-emitting element, and with ceramics or resin molding. For the resin molding of the package, an epoxy resin or a silicone resin is used together with a reflective member. For the ceramics of the package, aluminum oxide or aluminum nitride are used. An electrical connection of the light-emitting element to outside is accomplished via the conductive materials. A transparent member is arranged to cover the light-emitting element mounted on the inner lead portion of the lead frame. The transparent member can be configured to include a wavelength conversion member such as a phosphor and light diffusion material.

For the first optical member 30, for an example, a collimator lens is employed, and a first collimator lens 31 and a second collimator lens 32 allow the light from the light source 20 to be a parallel light. For the collimator lens used in the present embodiment, a composite lens such as configured with a combination of a concave lens and a convex lens, a combination of convex lenses, or such as configured with a single lens can be employed as long as the lens configuration allows light from the light source 20 to be parallel light.

The lens array 10 has a configuration as explained already. Using this lens array 10 can irradiate light to the irradiated plane of the light modulator 60 with desired irradiation intensity distribution. The lens array 10 is not limited regarding the number of lens groups and the number of lens arrays, as long as a desired irradiation intensity distribution can be obtained. The shape of the lens plane of the lens array 10 is not particularly limited to that of the input-lens collective body 11A or that of the output-lens collective body 11B.

The second optical member 55 is arranged in the light path between the lens array 10 and the light modulator 60 so that the light from the lens array 10 is inputted to the irradiated plane of the light modulator 60. In the present embodiment, the second optical member 55 employs a concave lens 40 and a reflecting mirror 50. The concave lens 40 is a lens for collecting the light from the lens array 10 onto the light modulator 60. This concave lens 40 collects the light from the lens array 10 to be irradiated onto the reflective surface area of the light modulator 60 via the reflecting mirror 50. The reflecting mirror 50 is a member for adjusting the incident angle of the light on the light modulator 60.

The light modulator 60 can vary the light path of the light delivered from the second optical member 55, the light modified by the lens array 10 to have a desired light intensity, and can output the light in such a manner that the light distribution is variable. This light modulator 60 is, for example, a DMD (Digital Micromirror Device). The light modulator 60 can coordinate a portion of light directed toward the projection lens 70 and a portion of light directed toward the projection lens 70 by controlling a plurality of micromirrors. The light delivered from the reflecting mirror 50 already has a desired light intensity distribution, the light modulator 60 can modulate the light distribution using the light intensity as is, and can output the light with less intensity loss to the projection lens 70 by reflecting the light by the micromirrors. More specifically, with the modulator 60, for example, a light intensity distribution required for a head light can be realized, wherein such a characteristic of shifted distribution is realized so that the light intensity of the center of the whole irradiated area is highest and the light intensity decrease towards the peripheral area of the irradiated area. As an example, the light modulator 60 is configured to transmit the light reflected by the reflecting mirror 50 to the projection lens 70.

The projection lens 70 magnify the light delivered from the light modulator 60 and outputs the light towards the imaging plane. This projection lens 70 can be configured as a single lens or with a composite lens. The projection lens 70 transmits the light which has a desired light intensity distribution and is delivered from the light modulator 60, to the imaging plane with a predetermined distance from the projection lens 70.

The lighting optical system 100 having the above configuration enables the light from the light source 20 to be adjusted to a desired light intensity distribution by using the lens array 10, and enables the light to irradiate outside by using the projection lens 70 with less light intensity loss by virtue of the light modulator 60. The lens array 10 can be easily formed without forming a large level difference in a connection portion between adjacent single lenses.

Variation Example of Lighting Optical System

Figure 15A:
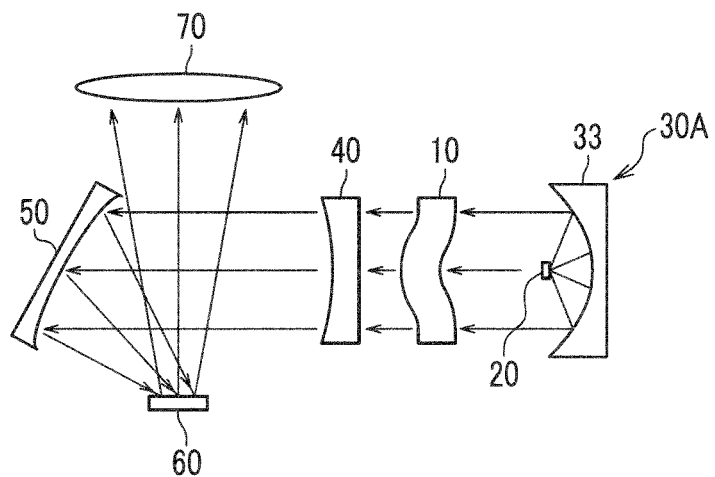
FIG. 15A is an explanatory figure schematically showing a configuration of the lighting optical system related to the present embodiment employing a reflective optical system for the first optical member.
Figure 15B:
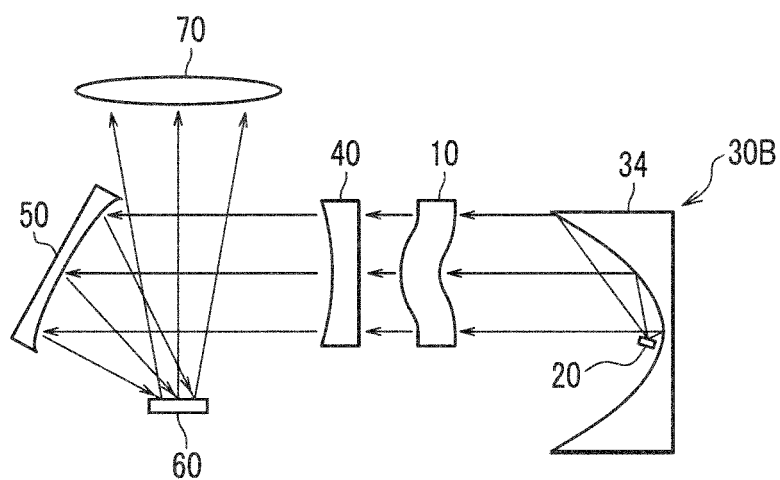
FIG. 15B is an explanatory figure schematically showing a configuration of the lighting optical system related to the present embodiment employing another reflective optical system for the first optical member.
Figure 16:
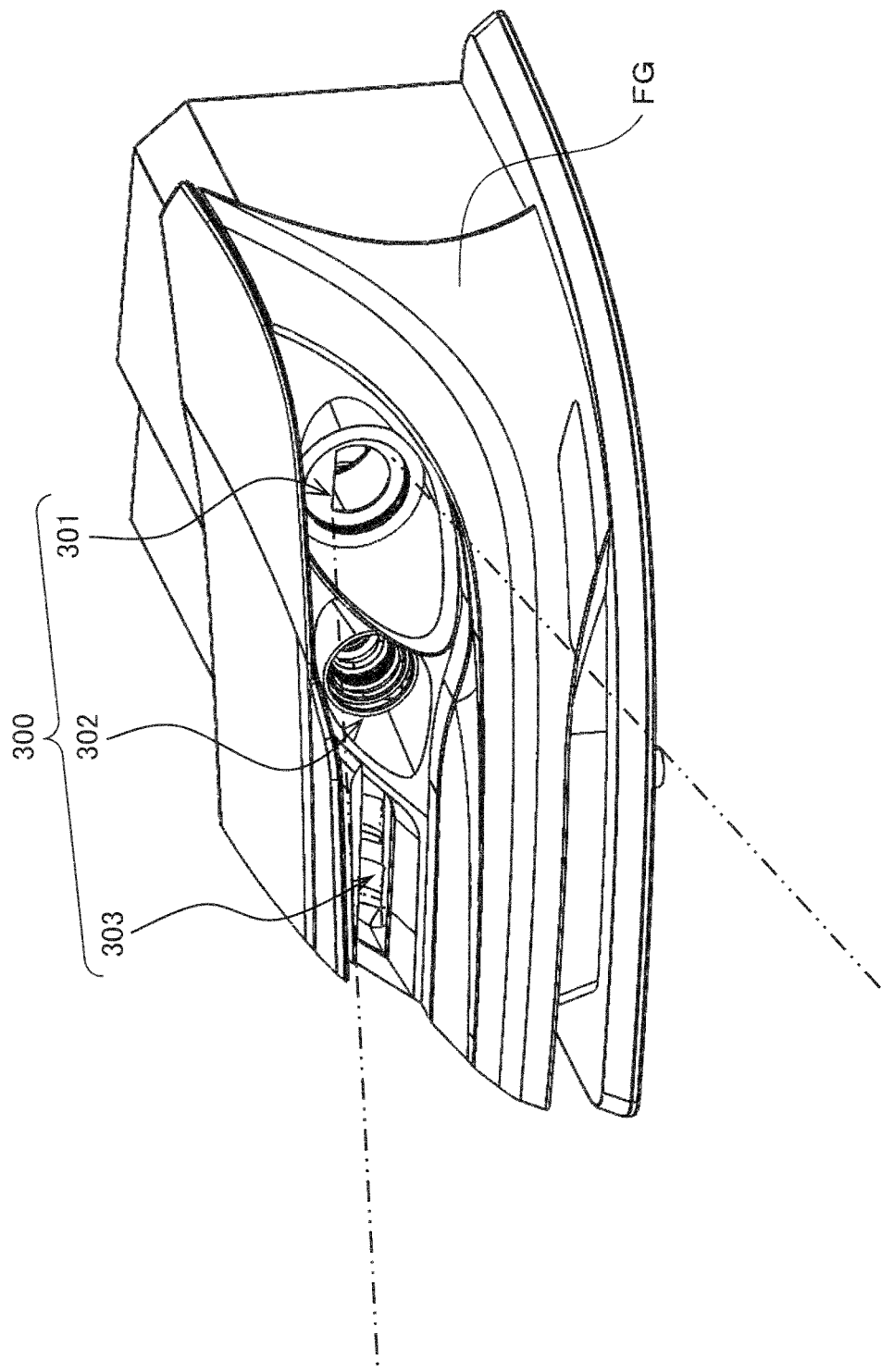
FIG. 16 is a perspective view schematically showing an example of the lighting optical system related to the present embodiment applied to a head light of a vehicle, where the front part of the vehicle is partially shown.

The first optical member 30 of the lighting optical system 100 can have a configuration as shown in FIGS. 15A and 15B.

As shown in FIG. 15A, a configuration in which the first optical member 30A is provided as a parabolic mirror 33, is also possible. The parabolic mirror 33 is arranged so that the light emitted from the light source 20 is reflected and input the light as a parallel light to the lens array 10. When a parabolic mirror 33 is employed, the light source 20 is arranged so that the light from the light source 20 travels towards the parabolic mirror 33. The light source 20 is arranged at the focal point of the parabolic mirror 33.

The first optical member 30 can have a configuration including an elliptical mirror 34 as the first optical member 30B as shown in FIG. 15B. The elliptical mirror 34 reflects the light from the light source 20 outputs the light as a parallel light, using the upper half of the parabolic surface of the elliptical mirror 34. The light source 20 is arranged at an angle and at a position so that the light entering the parabolic mirror 34 is converted into a parallel light.

Variation Examples of Respective Configurations

The lens array is not limited to the above explained configurations shown as the lens arrays 10, 10E to 10H and as the lighting optical system 100.

For example, although it has been explained that the irradiated region is configured by gathering two or three irradiated areas, the irradiated region can be configured with more irradiated areas. The respective irradiated areas can be defined by a plurality of irradiated sections. The respective irradiated areas can be defined either by a single irradiated area or by a plurality of irradiated sections. Further, although it has been explained that the irradiated region includes a plurality of irradiated areas each having a different size, the irradiated region can be also defined by a plurality of irradiated areas having a same size but having a different irradiated position. The respective lens groups do not have to be aligned in the order of increasing or decreasing vertical lens widths as long as the respective lens groups of the lens array have an equal lateral lens width. More specifically, for example, the lens array can be configured so that an odd numbered lens group is arranged closer to the lens plane center CL than an even numbered lens group having a vertical lens width different to that of the odd numbered group, resulting in a vertically symmetrical arrangement. It has been explained that the lens arrays 10, 10E to 10H is configured to be vertically symmetric with reference to the lens plane center CL and the light from two symmetrically arranged lens group is irradiated to the same irradiated region or the same irradiated area. However, lens arrays can be configured so that one irradiated region or one irradiated area is irradiated by the light from one single lens group.

Although, in the respective lens arrays shown above, it has been explained that the input lens width and the output lens width have the same width in the lateral direction, the input lens width and the output lens width can be different in the lateral direction. In addition to the selection of the input lens width and the output lens width, the number of lens groups and the number of lenses configuring these lens groups can be arranged to be same, or to be partially different, or to be all different. More specifically, the degree of freedom for setting the irradiated region EA is improved by adjusting the number of lenses of the lens groups. The respective lens arrays can have a configuration that the input-lens collective body and the output-lens collective body are integrally formed, or can have a configuration that the input-lens collective body and the output-lens collective body are separately formed and they are connected with a connecting member positioned at one or more predetermined positions between them while having a space therebetween.

Although it has been explained above that a DMD is employed as the light modulator 60 exemplarily in the lighting optical system 100, other devices, such as a spatial light modulator, can be employed for the light modulator 60.

As an example, the above-mentioned lighting optical system 100 can be used as a headlight installed on the front part of a vehicle. For example, as shown in FIGS. 16 to 19, when the lighting optical system 100 is used as a first headlight 301 of the headlight 300, this lighting optical system 100 can control the status of the light irradiation by allowing the light modulator 60 (e.g., DMD, or the like) to modulate the light transmitted from the light source via the lens array 10. The headlight 300 includes, for example, a first headlight 301 using light from a lighting optical system 100 including light modulator 60, a second headlight 302 using a light source of a LED etc. (e.g., a COB-type LED; COB stands for "Chip On Board"), and a base light 303 using a light source such as a LED.

Figure 17:
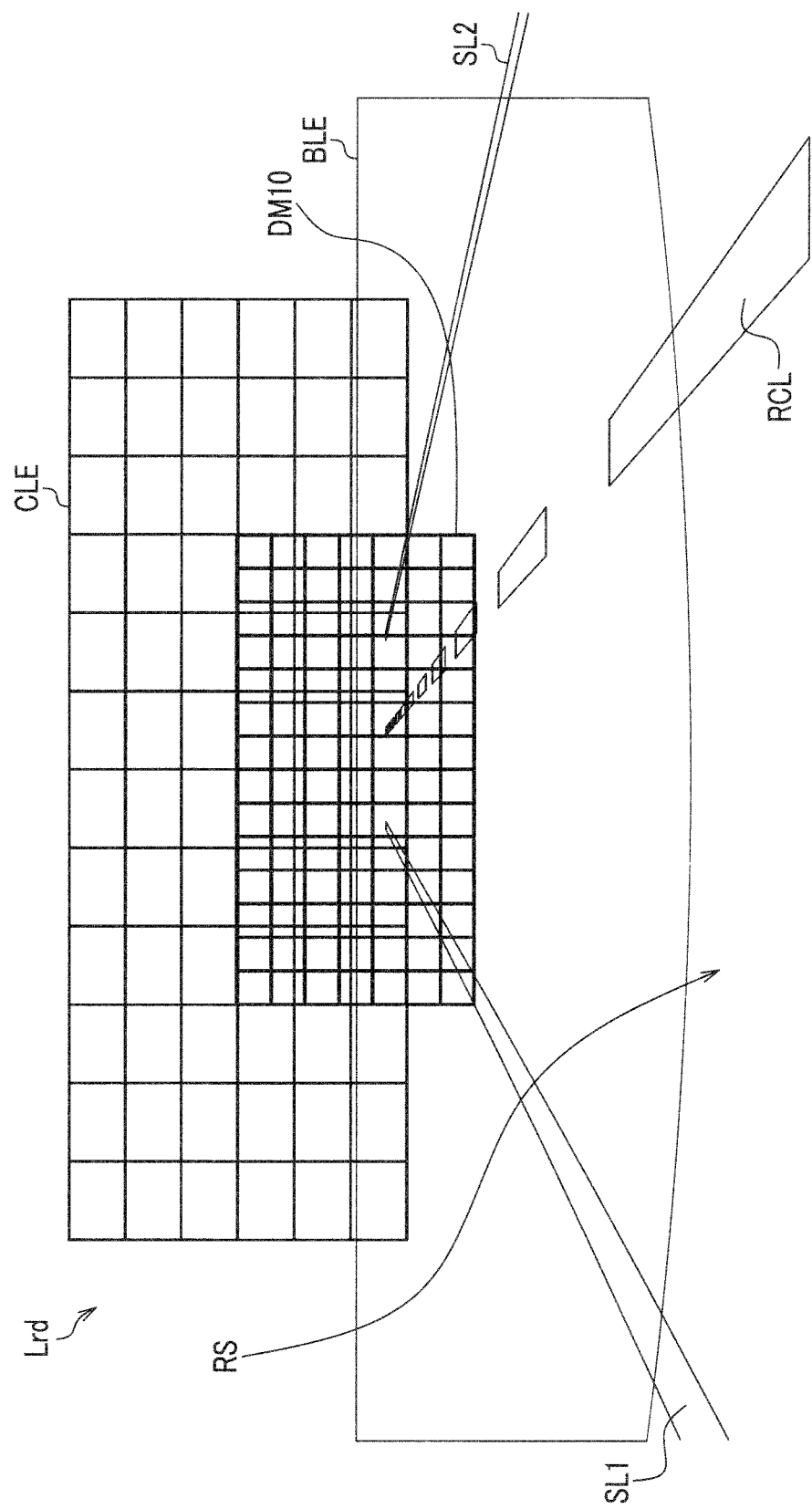
FIG. 17 is a perspective view showing an example of the lighting optical system related to the present embodiment applied to a head light of a vehicle, in which the irradiated region of light emitted from a first head light, a second head light and a base light are schematically shown.

In addition, in the case of left-hand traffic, as shown in FIG. 17, the irradiated region of the headlight 300 is so configured that the first headlight 301 irradiates the first regions DM10 which is defined upright in front of the vehicle on a left lane of the road surface RS of the road Lrd between the approximately center line RCL and the side line SL1 showing the lane width. The headlight 300 is designed to irradiate a second region CLE wider than the first region DM10, wider than the width defined by both side lines SL1, SL2, using the light from the second headlight. The headlight 300 is designed to irradiate a further wider third region BLE than the second region CLE, irradiating the region in a range from a position nearer to the vehicle than the first region DM10 to a position reaching the second region CLE.

Although the headlight 300 is designed so that the irradiated regions of the first headlight 301, the second headlight 302 and the base light 303 partially overlap with each other, any one of the regions may not overlap with the others or all regions may not overlap at all to each other. There is no particular limitation on overlap of these regions. The headlight 300 can be configured as only the first headlight 301, or as a combination of the first headlight 301 and the second headlight 302, or as a combination of the first headlight 301 and the base light 303.

Figure 18A:
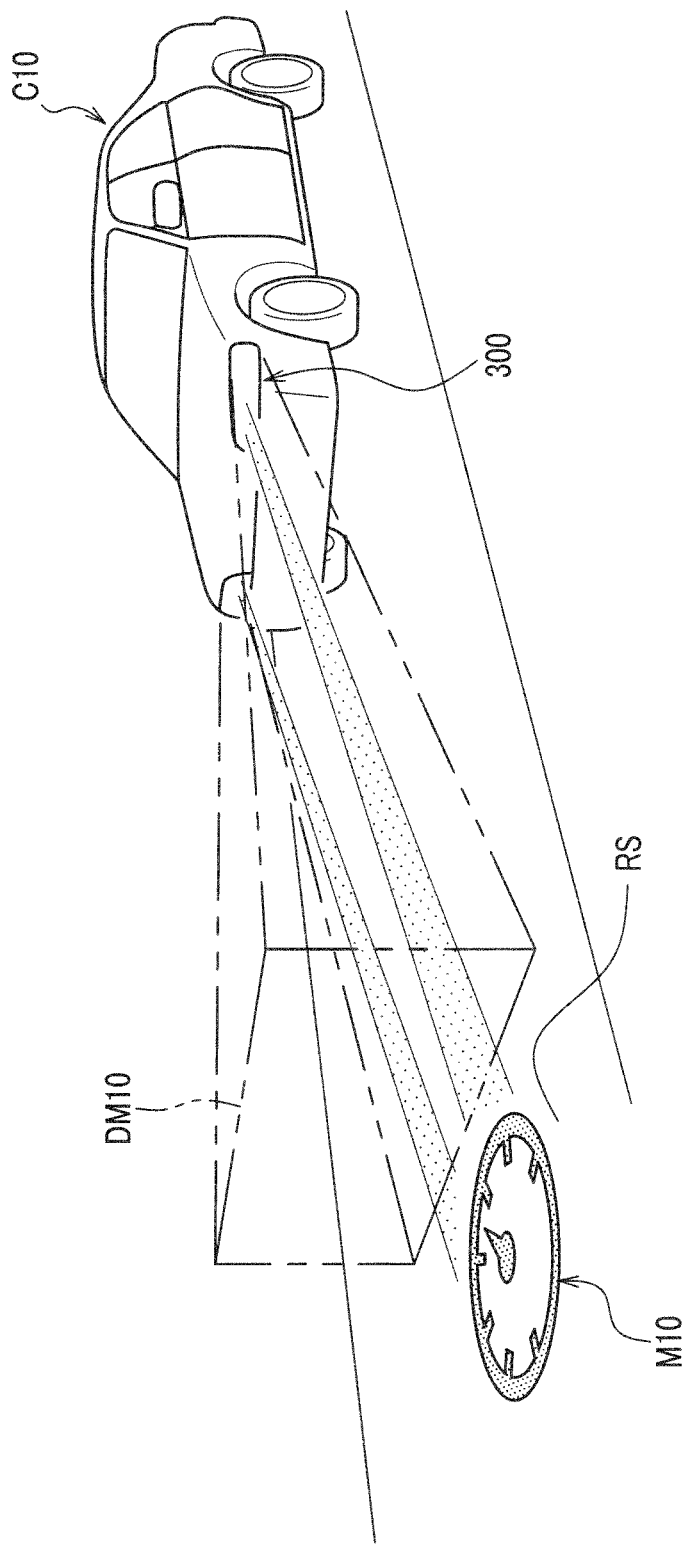
FIG. 18A is an explanatory figure showing an example of light emitted from the lighting optical system related to the present embodiment.
Figure 18B:
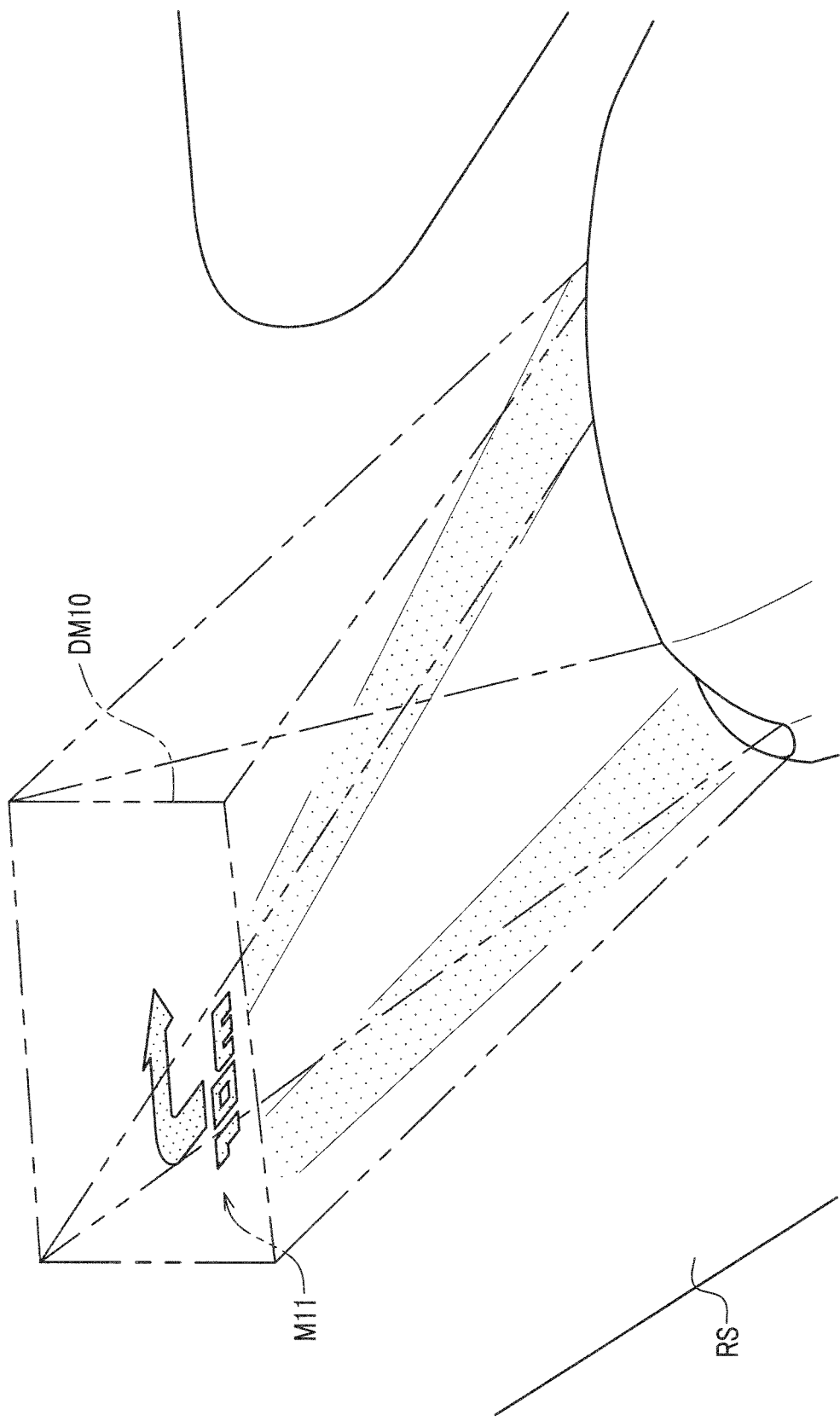
FIG. 18B is an explanatory figure showing another example of light emitted from the lighting optical system related to the present embodiment.

The first headlight 301 can irradiate the illumination light and can also display characters or symbols etc. by projecting these on the road surface RS with light controlled with the light modulator 60 which includes a plurality of micromirrors such as DMD. As exemplary shown in FIG. 18A, the first headlight 301 can project a speedometer M10 in a predetermined portion of the first area DM10, more specifically on the road surface RS, by controlling the light modulator 60, and irradiate the other portions of the first area DM10 with a normal illumination light. Similarly, as shown in FIG. 18B, the first headlight 301 can display a symbol M11 showing a right turn indication and a distance by projection of this symbol in a predetermined portion of the first area DM10, more specifically on the road surface RS, and irradiate the other portions of the first area DM10 with a normal illumination light, and thus a predetermined information can be projected by using the illumination light of the first headlight 301. The light including the light portions for illumination and for character display by projection etc. is formed by controlling a plurality of micromirrors (DMD) which are arrayed in the light modulator 60 corresponding to the first area DM10.

Figure 19A:
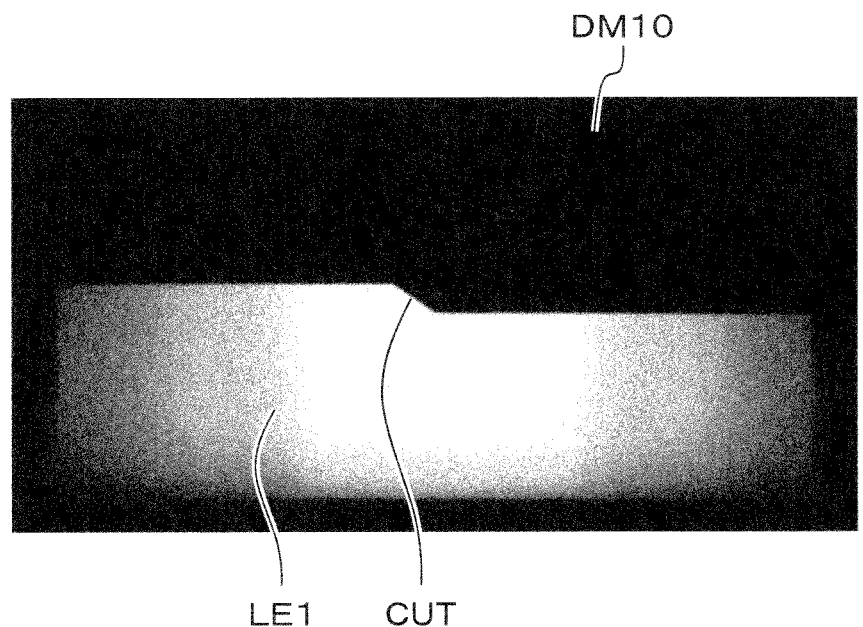
FIG. 19A is an explanatory figure showing bright and dark regions of first condition of light emitted from the lighting optical system related to the present embodiment.

The first headlight 301 can have a configuration not to irradiate a portion of the first area DM10, a portion which is not intended to be irradiated, by controlling the light modulator 60. For example, as shown in FIG. 19A, the lower half of the first area DM10 is used as an irradiated area LE1 irradiated with the light from the first headlight 301. Then, in the first region DM10, a cutline CUT is formed at the upper end portion of the irradiated area LE1. Forming the cutline CUT in the first area DM10 can inhibit a driver of an oncoming vehicle from feeling glair when the oncoming vehicle is present on the oncoming lane.

Figure 19B:
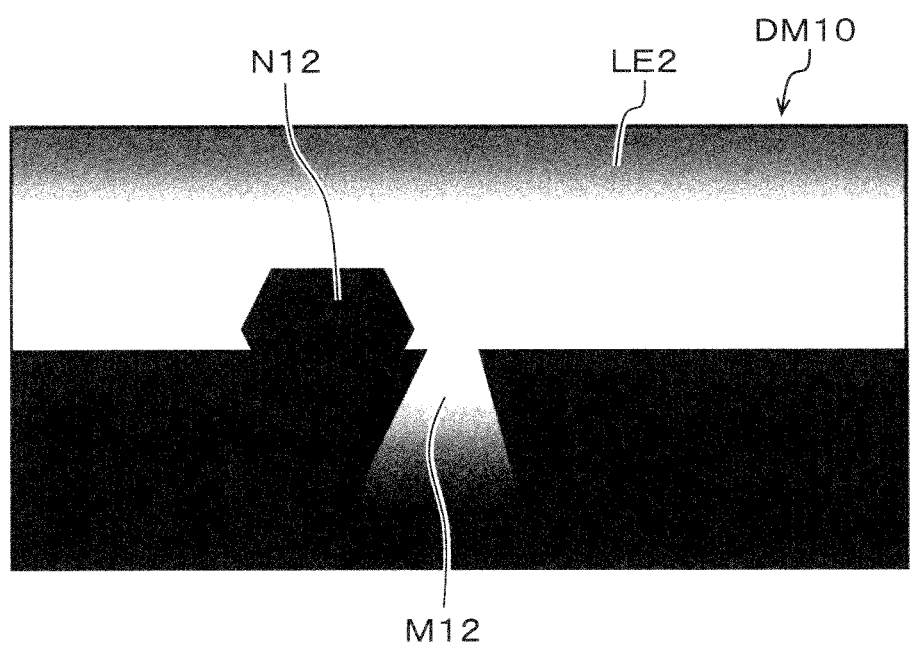
FIG. 19B is an explanatory figure showing bright and dark regions of second condition of light emitted from the lighting optical system related to the present embodiment.

As shown in FIG. 19B, the first headlight 301 can also have a configuration to irradiate the upper half portion above the center of the first area DM10 as an irradiated area LE2. In addition, the first headlight 301 in the present disclosure can also have a configuration to irradiate the portion M12 corresponding to the center line RCL while inhibiting irradiation to the area N12 corresponding to an oncoming vehicle to protect a driver of the oncoming vehicle on the oncoming lane from feeling glair. The first area DM10 in FIG. 19B is adapted to the light irradiated from the first headlight 301 in the case of right-hand traffic.

Figure 19C:
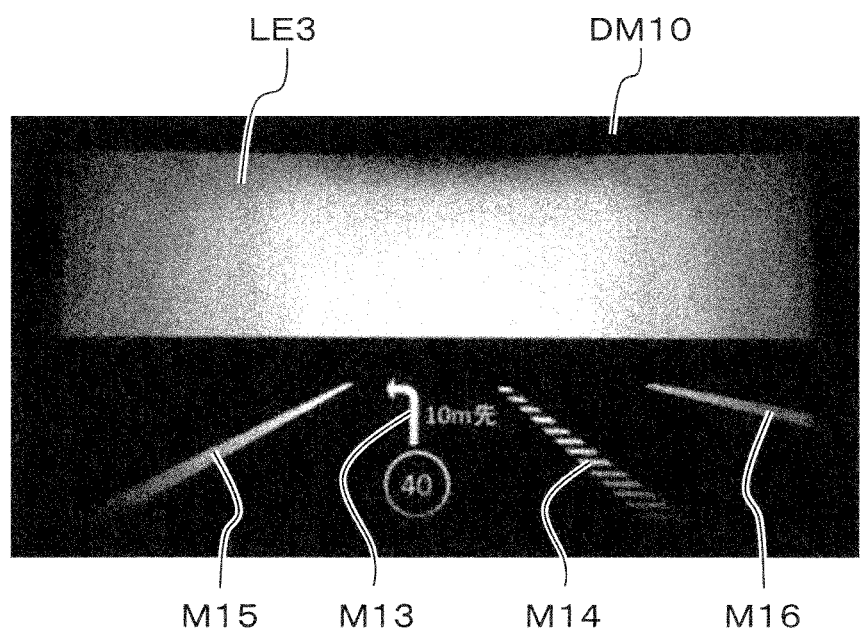
FIG. 19C is an explanatory figure showing bright and dark regions of third condition of light emitted from the lighting optical system related to the present embodiment.

As shown in FIG. 19C, the first headlight 301 can also arrange the light to illuminate the upper half portion above the center of the first area DM10 as an irradiated area LE3, and the lower half is used for the area for displaying characters by projecting these with light. Then, in the first area DM10, as an example of projection with light, it is possible to arrange display portions on the road surface RS such as a character symbol display portion M13 to which character symbols such as an arrow symbol and characters showing speed limitation are projected, a first traffic sign display portion M14 in which the center line RCL is displayed by projection, and a second traffic sign display portions M15, M16, in which the side lines SL1, SL2 are displayed by projection, can be set for better identification of these. The information about the center line RCL and the side lines SL1, SL2, for projection of these in the first area DM10, can be obtained by processing of an image including various traffic markings along the road, which image can be taken with an additional on-board camera (not shown), or by processing various information of road surface, road lane, and road shape, which may be provided for automated driving.

For the lighting optical system 100, the efficiency of the headlight can be given exemplarily as below. More specifically, when for the light source of the first headlight, an LED which generates a luminous flux of 3701 lm at a driving current 5 A and at a junction temperature 88° C. is employed, and when this LED is driven by 92% duty ratio, the luminous flux of light emitted from the LED is 3405 lm [=3701 lm×0.92]. In this case, the light flux of light emitted from the lighting optical system 100 to the headlight can be, for example, 1587 lm, and thus the efficiency is 46.6% (=1587 lm/3405 lm).

In the above, although it has been explained that the lighting optical system 100 is applied exemplarily to a headlight of a vehicle, other various characters and diagrams than shown in the above explained figures can be also projected. Further, the application of the lighting optical system 100 is not limited to the headlight of a vehicle, and it is needless to say that it can be applied also to various lighting equipment such as a spotlight, a display, etc.

In the above explanations, examples of input-lens collective bodies and output-lens collective bodies having been formed vertically symmetrical with reference to the lens plane center CL in the vertical direction, except for FIG. 13A. However, it can be apparent that also an asymmetrical arrangement in the vertical direction is possible, as can be seen in FIG. 13A. For example, the vertical lens widths of the lenses of the first to third input lens groups 11NL1 to 11NL3 can be different, by which the vertical widths of the first to third irradiated areas E1 to E3 can be different.

Although it has been described above that "one direction" is lateral direction and "the other direction" is vertical direction in the lighting optical system according to the present disclosure, this lighting optical system can also be mounted, for example, 90° rotated with respect to the above explained embodiments. Thus, it can be clear that the present invention can be applied in various arrangement for various purposes and forms.

The lens array and the lighting optical system related to the present invention can be applied to various lighting optical system or lighting equipment for a vehicle (including a motorcycle, an automobile, and for a conveying machine), a ship, or an airplane. Besides, the lens array and the lighting optical system related to the present invention can be applied for various illumination light sources such as a spotlight, and in various light source such as display light source, on-board parts (e.g., parts for vehicle, ships or airplane), interior lighting, exterior lighting.

The invention claimed is:
1. A lens array, comprising:
an input-lens collective body, which is a collective body of input lenses each having a different optical power in a first direction and in a second direction orthogonal to the first direction, said input lenses being aligned along the second direction for which the input lenses have a larger optical power; and
an output-lens collective body, which is a collective body of output lenses each having a different optical power in the first direction and in the second direction orthogonal to the first direction, said output lenses being optically opposed to the input lenses and being aligned along the second direction,
wherein
respective lens dimensions of the input lenses are defined so that the input-lens collective body forms a predetermined irradiated region in an irradiated plane by a collection of irradiated areas of light irradiated from the lens array, and wherein
positions of respective lens protruding end portions of the output lenses are defined so that respective irradiated areas of the output lenses correspond to any one of the irradiated areas which area respectively formed at different positions, and at least a portion of each of the irradiated areas overlaps with at least a portion of adjacent irradiated areas.

2. The lens array according to claim 1, wherein the input lenses respectively have a substantially equal lens width in the second direction so that the irradiated areas respectively have substantially equal widths in the second direction.

3. The lens array according to claim 1, wherein the input lenses have different lens widths in the second direction so that the irradiated areas have different widths in the second direction.

4. The lens array according to claim 1, wherein the lens widths of the input lenses in the second direction increase approaching both ends of the input-lens collective body from a center of lens plane in the second direction.

5. The lens array according to claim 1, wherein the output lenses respectively have a substantially equal lens width in the second direction.

6. The lens array according to claim 1, wherein the input lenses respectively have a substantially equal lens width in the second direction,
the output lenses have a substantially equal lens width in the second direction,
and
the input lenses in the second direction have smaller widths than the output lenses in the second direction.

7. The lens array according to claim 1, wherein the input lenses respectively have a lens width in the second direction so that the irradiated areas having a common center and different widths in the second direction,
the output lenses respectively have a lens protruding end portion in such positions that light is irradiated to the irradiated areas having a common center and different widths in the second direction.

8. The lens array according to claim 1, wherein the input-lens collective body is formed with input lens groups each including the input lenses, wherein the input lenses have widths in the second direction so that each of the input lens groups forms a corresponding irradiated area of the irradiated areas,
the output-lens collective body is formed with output lens groups each including the input lenses, wherein the output lenses respectively have a lens protruding end portion in such positions that each of the output lens groups irradiates light to a corresponding irradiated area of the irradiated areas.

9. The lens array according to claim 1, wherein the input-lens collective body is formed with input lens groups which respectively include a single input lens or a plurality of input lenses, wherein the single input lens or the plurality of input lenses has/have width(s) in the second direction so that each of the input lens groups forms a corresponding irradiated area of the irradiated areas,
the output-lens collective body is formed with output lens groups which respectively include a single output lens or a plurality of output lenses, wherein the single output lens or the plurality of output lenses has/have lens protruding end portion(s) of the single output lens or the plurality of output lenses in such positions that each of the output lens groups irradiates light to a corresponding irradiated area of the irradiated areas.

10. The lens array according to claim 8, wherein in the input-lens collective body, one of the input lens groups having a smallest lens width in the second direction is arranged at center in the second direction, and one of the input lens groups having a largest lens width in the second direction is arranged at both ends of the input-lens collective body,
in the output-lens collective body, one of the output lens groups arranged at center in the second direction includes the output lenses which respectively have a lens protruding end portion so that light is irradiated to an irradiated area having a smallest width in the second direction and being arranged at center of the irradiated region, and one of the output lens groups arranged in the second direction at both ends of the output-lens collective body includes the output lenses which respectively have a lens protruding end portion so that light is irradiated to an irradiated area having a largest width in the second direction.

11. The lens array according to claim 8, wherein the input lens groups are respectively formed with the same number of input lenses,
the output lens groups are respectively formed with the same number of output lenses,
wherein
the input lenses forming the input lens groups and the output lenses forming the output lens groups have the same number of lenses.

12. The lens array according to claim 8, wherein at least one of the input lens groups are formed with a different number of input lenses than other input lens groups,
the output lens groups are respectively formed so that the number of the output lenses of each of the lens group is the same as the number of the input lenses of corresponding ones of the input lens groups.

13. The lens array according to claim 1, wherein the output lenses respectively have a lens protruding end portion in such positions that irradiation intensity is high at center of the irradiated region and decreases approaching periphery of the irradiated region.

14. The lens array according to claim 4, wherein an input lens plane of the input-lens collective body has a concave shape at center in the second direction so as to project at both end sides in the second direction in a state where facing the output-lens collective body, and
an output lens plane of the output-lens collective body has a curved surface approximately parallel to the input lens plane.

15. The lens array according to claim 6, wherein an input lens plane of the input-lens collective body has a circular arc shape towards the facing output-lent collective body, and
an output lens plane of the output-lens collective body has a circular arc shape approximately concentric to the input lens plane.

16. The lens array according to claim 1, wherein the output lens is arranged at position close to a focusing point of the input lens on a side having a large optical power.

17. The lens array according to claim 1, wherein toroidal lenses are employed for the input lenses of the input-lens collective body and/or for the output lenses of the output-lens collective body, and the toroidal lenses are aligned in the second direction and are formed with a same curvature in the first direction.

18. A lighting optical system, comprising:
a first optical member arranged in an optical path of light emitted from a light source, said first optical member transforming light from the light source to be approximately parallel,
the lens array according to claim 1;
a second optical member arranged in an optical path of light from the lens array;
light modulator which outputs light inputted from the second optical member by changing light path of the light: and
a projection lens projecting light from the light modulator.

19. The lighting optical system according to claim 18, wherein
the light source is a light-emitting diode or a laser diode.

20. The lighting optical system according to claim 18, wherein
the first optical member is a collimator lens which transforms light from the light source into approximately parallel light.

21. The lighting optical system according to claim 18, wherein
the first optical member is a reflecting mirror which reflects light from the light source and outputs as parallel light.

* * * * *